US012352235B2

(12) United States Patent
Zha

(10) Patent No.: US 12,352,235 B2
(45) Date of Patent: Jul. 8, 2025

(54) WIND TURBINE BLADES AND WIND TURBINE SYSTEMS THAT INCLUDE A CO-FLOW JET

(71) Applicant: COFLOW JET, LLC, Cutler Bay, FL (US)

(72) Inventor: Gecheng Zha, Cutler Bay, FL (US)

(73) Assignee: COFLOW JET, LLC, Cutler Bay, FL (US)

(*) Notice: Subject to any disclaimer, the term of this patent is extended or adjusted under 35 U.S.C. 154(b) by 0 days.

(21) Appl. No.: 17/702,351

(22) Filed: Mar. 23, 2022

(65) Prior Publication Data
US 2022/0307462 A1    Sep. 29, 2022

Related U.S. Application Data

(60) Provisional application No. 63/166,341, filed on Mar. 26, 2021.

(51) Int. Cl.
F03D 1/06    (2006.01)

(52) U.S. Cl.
CPC ...... *F03D 1/0641* (2013.01); *F05B 2260/601* (2013.01); *F05B 2260/63* (2013.01)

(58) Field of Classification Search
CPC ............... F03D 1/0641; F03D 1/0675; F05B 2260/601; F05B 2260/63; Y02E 10/72
See application file for complete search history.

(56) References Cited

U.S. PATENT DOCUMENTS

| 1,580,577 A | 4/1926 | Baumann |
|---|---|---|
| 1,714,608 A | 5/1929 | Massey |
| 1,771,257 A | 7/1930 | Ingram |
| 1,772,196 A | 8/1930 | Wallace |
| 1,806,927 A | 5/1931 | Aldrich |
| 1,810,693 A | 6/1931 | Heraclio |

(Continued)

FOREIGN PATENT DOCUMENTS

| CA | 3045209 A1 | 6/2018 |
|---|---|---|
| CN | 104176241 | 12/2014 |

(Continued)

OTHER PUBLICATIONS

European Communication pursuant to Article 94(3) EPC, Application No. 18202156.8, dated Apr. 14, 2022.

(Continued)

*Primary Examiner* — David E Sosnowski
*Assistant Examiner* — Wayne A Lambert
(74) *Attorney, Agent, or Firm* — MacMillan, Sobanski & Todd, LLC

(57) ABSTRACT

Wind turbine blades and wind turbine systems that include a co-flow jet are described. An example wind turbine blade has a main body and a fluid pressurizer. The main body has a first portion, a second portion, a leading edge, a trailing edge, an injection opening, a suction opening, and a channel. The first portion has a first cross-sectional shape and the second portion has a second cross-sectional shape that is different than the first cross-sectional shape. The injection opening is disposed on the first portion between the leading edge and the trailing edge. The channel extends from the suction opening to the injection opening. The fluid pressurizer is disposed within the channel.

20 Claims, 12 Drawing Sheets

(56) References Cited

U.S. PATENT DOCUMENTS

| | | |
|---|---|---|
| 1,829,616 A | 10/1931 | Stalker |
| 1,845,307 A | 2/1932 | Maxwell |
| 1,861,336 A | 5/1932 | Cox |
| 1,888,871 A | 11/1932 | Apperman |
| 1,993,419 A | 3/1935 | Stalker |
| 2,039,676 A | 5/1936 | Zaparka |
| 2,041,795 A | 5/1936 | Stalker |
| 2,063,030 A | 12/1936 | Goodman Crouch |
| 2,071,744 A | 2/1937 | Anathor-Henrikson |
| 2,075,817 A | 4/1937 | Loerke |
| 2,077,071 A | 4/1937 | Rose |
| 2,078,854 A | 4/1937 | Jones |
| 2,082,674 A | 6/1937 | Young |
| 2,219,234 A | 10/1940 | Messerschmitt |
| 2,223,744 A | 12/1940 | Stalker |
| 2,225,525 A | 12/1940 | Pitcairn |
| 2,267,927 A | 12/1941 | Kightlinger |
| 2,352,144 A | 6/1944 | Woods |
| 2,377,386 A | 6/1945 | Stalker |
| 2,406,918 A | 9/1946 | Stalker |
| 2,421,694 A | 6/1947 | Hawkins |
| 2,427,972 A | 9/1947 | Melchior |
| 2,438,942 A | 4/1948 | Polk |
| 2,464,726 A | 3/1949 | Stalker |
| 2,469,902 A | 5/1949 | Stalker |
| 2,478,793 A | 8/1949 | Serge |
| 2,507,611 A | 5/1950 | Pappas |
| 2,511,504 A | 6/1950 | Hawkins |
| 2,514,513 A | 7/1950 | Price |
| 2,584,666 A | 2/1952 | Bockrath |
| 2,585,676 A | 2/1952 | Poisson-Quinton |
| 2,597,769 A | 5/1952 | Ashkenas |
| 2,605,983 A | 8/1952 | Stalker |
| 2,619,302 A | 11/1952 | Loedding |
| 2,714,495 A | 8/1955 | Focke |
| 2,734,701 A | 2/1956 | Horton |
| 2,809,793 A | 10/1957 | Warner |
| 2,841,344 A | 7/1958 | Stroukoff |
| 2,873,931 A | 2/1959 | Fleischmann |
| 2,892,582 A | 6/1959 | O'Rourke |
| 2,910,254 A | 10/1959 | Razak |
| 2,941,751 A | 6/1960 | Gagarin |
| 2,946,541 A | 7/1960 | Boyd |
| 2,961,192 A | 11/1960 | Davidson et al. |
| 2,966,028 A | 12/1960 | Johnson et al. |
| 3,011,762 A | 12/1961 | Pouit |
| 3,029,043 A | 4/1962 | Churchill |
| 3,029,044 A | 4/1962 | Childress |
| 3,032,977 A | 5/1962 | Neitzel |
| 3,039,719 A | 6/1962 | Platt |
| 3,045,947 A | 7/1962 | Bertin |
| 3,055,614 A | 9/1962 | Thompson |
| 3,085,740 A | 4/1963 | Wagner |
| 3,097,817 A | 7/1963 | Towzey, Jr. |
| 3,101,678 A | 8/1963 | Grube |
| 3,128,037 A | 4/1964 | McClellan |
| 3,128,063 A | 4/1964 | Kaplan |
| 3,128,364 A | 4/1964 | Wanttaja |
| 3,144,220 A | 8/1964 | Kittelson |
| 3,161,377 A | 12/1964 | Balluff |
| 3,191,820 A | 6/1965 | Kuster |
| 3,193,215 A | 7/1965 | Dunham |
| 3,251,319 A | 5/1966 | Kaupert |
| 3,261,576 A | 7/1966 | Valyi |
| 3,262,658 A | 7/1966 | Reilly |
| 3,291,420 A | 12/1966 | Laing |
| 3,298,636 A | 1/1967 | Arnholdt |
| 3,302,903 A | 2/1967 | Vogel |
| 3,417,767 A | 12/1968 | Young |
| 3,430,894 A | 3/1969 | Torstein |
| 3,438,599 A | 4/1969 | Welzen |
| 3,441,236 A | 4/1969 | Arnholdt |
| 3,478,987 A | 11/1969 | Dorand |
| 3,506,220 A | 4/1970 | Sbrilli |
| 3,507,463 A | 4/1970 | Kuntz |
| 3,525,486 A | 8/1970 | Wimpenny |
| 3,540,681 A | 11/1970 | Orazi |
| 3,545,701 A | 12/1970 | Bertin |
| 3,572,612 A | 3/1971 | Irbitis |
| 3,576,300 A | 4/1971 | Palfreyman |
| 3,586,267 A | 6/1971 | Ingelman-Sundberg |
| 3,658,279 A | 4/1972 | Robertson |
| 3,666,209 A | 5/1972 | Taylor |
| 3,719,428 A | 3/1973 | Dettmering |
| 3,726,084 A | 4/1973 | Meier |
| 3,807,663 A | 4/1974 | Bartoe |
| 3,887,146 A | 6/1975 | Bright |
| 3,917,193 A | 11/1975 | Runnels, Jr. |
| 3,977,629 A | 8/1976 | Tubeuf |
| 4,033,526 A | 7/1977 | Benson |
| 4,086,022 A | 4/1978 | Freeman |
| 4,117,995 A | 10/1978 | Runge |
| 4,169,567 A | 10/1979 | Tamura |
| 4,214,722 A | 7/1980 | Tamura |
| 4,258,889 A | 3/1981 | Hunt |
| 4,285,482 A | 8/1981 | Lewis |
| 4,375,937 A | 3/1983 | Cooper |
| 4,375,938 A | 3/1983 | Dussourd |
| 4,381,091 A | 4/1983 | Pegram |
| 4,391,424 A | 7/1983 | Bartoe, Jr. |
| 4,398,683 A | 8/1983 | Schmetzer |
| 4,398,688 A | 8/1983 | Williams |
| 4,519,563 A | 5/1985 | Tamura |
| 4,630,997 A | 12/1986 | Cousteau et al. |
| 4,710,101 A | 12/1987 | Jamieson |
| 4,771,602 A | 9/1988 | Ruiz |
| 4,804,155 A | 2/1989 | Strumbos |
| 4,813,631 A | 3/1989 | Gratzer |
| 4,828,203 A | 5/1989 | Clifton |
| 4,848,701 A | 7/1989 | Belloso |
| 4,928,907 A | 5/1990 | Zuck |
| 4,976,349 A | 12/1990 | Adkins |
| 4,990,053 A | 2/1991 | Rohne |
| 5,016,837 A | 5/1991 | Willis |
| 5,098,034 A | 3/1992 | Lendriet |
| 5,255,881 A | 10/1993 | Rao |
| 5,280,863 A | 1/1994 | Schmittle |
| 5,282,718 A | 2/1994 | Koff |
| 5,289,848 A | 3/1994 | Jenisch, Jr. |
| 5,308,225 A | 5/1994 | Koff |
| 5,335,885 A | 8/1994 | Bohning |
| 5,395,073 A | 3/1995 | Rutan |
| 5,474,417 A | 12/1995 | Privett |
| 5,542,149 A | 8/1996 | Yu |
| 5,586,859 A | 12/1996 | Nolcheff |
| 5,607,284 A | 3/1997 | Byrne |
| 5,687,934 A | 11/1997 | Owens |
| 5,687,937 A | 11/1997 | Habib |
| 5,707,206 A | 1/1998 | Goto |
| 5,765,777 A | 6/1998 | Schmittle |
| 5,769,359 A | 6/1998 | Rutan |
| 5,899,416 A | 5/1999 | Meister |
| 6,068,446 A * | 5/2000 | Tangler .............. F03D 1/0641 416/223 R |
| 6,089,503 A | 7/2000 | Volk |
| 6,119,987 A | 9/2000 | Kiknadze |
| 6,220,012 B1 | 4/2001 | Hauser |
| 6,231,301 B1 | 5/2001 | Barnett |
| 6,264,425 B1 | 7/2001 | Keller |
| 6,368,059 B1 | 4/2002 | Maines |
| 6,464,171 B2 | 10/2002 | Ruffin |
| 6,543,720 B2 | 4/2003 | Ladd |
| 6,585,479 B2 | 7/2003 | Torrance |
| 6,669,142 B2 | 12/2003 | Saiz |
| 6,796,533 B2 | 9/2004 | Barrett |
| 6,817,308 B1 | 11/2004 | Miller |
| 6,896,221 B1 | 5/2005 | Einarsson |
| 6,923,403 B1 | 8/2005 | Dizdarevic |
| 6,935,833 B2 | 8/2005 | Seitz |
| 7,074,006 B1 | 7/2006 | Hathaway |
| 7,104,143 B1 | 9/2006 | Powell |

(56) References Cited

U.S. PATENT DOCUMENTS

| | | | |
|---|---|---|---|
| 7,143,983 B2 | 12/2006 | McClure | |
| 7,308,762 B2 | 12/2007 | Bath | |
| 7,354,247 B2 | 4/2008 | Bonnet | |
| 7,435,057 B2 | 10/2008 | Parera | |
| 7,441,724 B2 | 10/2008 | Parks | |
| 7,520,465 B2 | 4/2009 | Mahjoub | |
| 7,575,412 B2 | 8/2009 | Seitz | |
| 7,673,832 B2 | 3/2010 | Meister | |
| 7,837,438 B2 | 11/2010 | Campbell | |
| 7,878,458 B2 | 2/2011 | Shmilovich | |
| 8,128,037 B2 | 3/2012 | Powell | |
| 8,128,364 B2 | 3/2012 | Pesetsky | |
| 8,191,820 B1 | 6/2012 | Westra | |
| 8,245,976 B2 | 8/2012 | Sakurai | |
| 8,246,311 B2 | 8/2012 | Pesetsky | |
| 8,251,317 B2 | 8/2012 | Pitt | |
| 8,251,319 B2 | 8/2012 | Jonker | |
| 8,262,031 B2 | 9/2012 | Zha | |
| 8,302,903 B2 | 11/2012 | Morgan | |
| 8,303,250 B2 * | 11/2012 | Mohammed | F03D 7/0232 |
| | | | 416/23 |
| 8,444,383 B1 | 5/2013 | Baker | |
| 8,448,892 B2 | 5/2013 | Zhu | |
| 8,459,597 B2 | 6/2013 | Cloft | |
| 8,469,907 B2 | 6/2013 | Ichihashi | |
| 8,485,476 B2 | 7/2013 | Zha | |
| 8,561,935 B2 | 10/2013 | Milde, Jr. | |
| 8,807,940 B2 | 8/2014 | Grabau | |
| 8,829,706 B1 | 9/2014 | Sammy | |
| 8,932,024 B2 | 1/2015 | Hayashi | |
| 9,115,594 B2 | 8/2015 | Krautheim | |
| 9,133,819 B2 | 9/2015 | Zuteck | |
| 9,205,912 B2 | 12/2015 | Clark | |
| 9,611,865 B2 | 4/2017 | Morel | |
| 9,726,084 B2 | 8/2017 | Duong | |
| 9,815,545 B1 | 11/2017 | Steer | |
| 9,822,792 B2 | 11/2017 | Guemmer | |
| 9,862,480 B2 | 1/2018 | Brakes | |
| 10,106,246 B2 | 10/2018 | Zha | |
| 10,252,789 B2 | 4/2019 | Zha | |
| 10,315,754 B2 | 6/2019 | Zha | |
| 10,337,493 B2 * | 7/2019 | Chen | F03D 3/062 |
| 10,371,121 B1 | 8/2019 | Alhussan | |
| 10,683,076 B2 | 6/2020 | Zha | |
| 10,683,077 B2 | 6/2020 | Zha | |
| 10,724,435 B2 | 7/2020 | Kroger | |
| 10,815,886 B2 | 10/2020 | Kroger | |
| 11,034,430 B2 | 6/2021 | Zha | |
| 2002/0139894 A1 | 10/2002 | Sorensen | |
| 2002/0195526 A1 | 12/2002 | Barrett | |
| 2003/0035715 A1 | 2/2003 | Torrance | |
| 2003/0150962 A1 | 8/2003 | Orban | |
| 2004/0003471 A1 | 1/2004 | VanSteenburg | |
| 2005/0111968 A1 | 5/2005 | Lapworth | |
| 2005/0152775 A1 | 7/2005 | Japikse | |
| 2005/0226717 A1 | 10/2005 | Xu | |
| 2006/0102801 A1 | 5/2006 | Manley | |
| 2006/0196633 A1 | 9/2006 | Mahjoub | |
| 2006/0219847 A1 | 10/2006 | Miller et al. | |
| 2007/0095970 A1 | 5/2007 | Richardson | |
| 2007/0196204 A1 | 8/2007 | Seitz | |
| 2007/0217902 A1 | 9/2007 | Sirakov | |
| 2007/0221788 A1 | 9/2007 | Meister | |
| 2007/0228222 A1 | 10/2007 | Davis | |
| 2008/0044273 A1 | 2/2008 | Khalid | |
| 2009/0014592 A1 | 1/2009 | Zha | |
| 2009/0065631 A1 | 3/2009 | Zha | |
| 2009/0095446 A1 | 4/2009 | Hamstra | |
| 2009/0108141 A1 | 4/2009 | Shmilovich | |
| 2009/0169394 A1 | 7/2009 | Crow et al. | |
| 2009/0173834 A1 | 7/2009 | Prince | |
| 2009/0263234 A1 | 10/2009 | Yin | |
| 2010/0104436 A1 | 4/2010 | Herr | |
| 2010/0127129 A1 | 5/2010 | Zha | |
| 2010/0135795 A1 | 6/2010 | Nies et al. | |
| 2010/0143121 A1 | 6/2010 | Haans | |
| 2010/0143122 A1 | 6/2010 | Nies | |
| 2010/0303634 A1 | 12/2010 | Long | |
| 2011/0001000 A1 | 1/2011 | Zhu | |
| 2011/0001020 A1 | 1/2011 | Forgac | |
| 2011/0044796 A1 | 2/2011 | Hussain | |
| 2011/0103950 A1 | 5/2011 | Pesetsky | |
| 2011/0103952 A1 | 5/2011 | Pesetsky | |
| 2011/0103953 A1 | 5/2011 | Haans | |
| 2011/0103963 A1 * | 5/2011 | Bendel | F03D 13/10 |
| | | | 416/229 R |
| 2011/0142638 A1 | 6/2011 | McGrath | |
| 2011/0206506 A1 | 8/2011 | Nies | |
| 2011/0206507 A1 * | 8/2011 | Bhaisora | F03D 1/0675 |
| | | | 416/1 |
| 2011/0206531 A1 | 8/2011 | Kroo | |
| 2011/0210211 A1 | 9/2011 | Zha | |
| 2011/0215172 A1 | 9/2011 | Todorovic | |
| 2011/0229322 A1 | 9/2011 | Tadayon | |
| 2011/0229329 A1 | 9/2011 | Occhipinti | |
| 2012/0043428 A1 | 2/2012 | Goelling | |
| 2012/0068020 A1 | 3/2012 | Milde, Jr. | |
| 2012/0074264 A1 | 3/2012 | Heaton | |
| 2012/0082562 A1 | 4/2012 | Kotler | |
| 2012/0145834 A1 | 6/2012 | Morgan | |
| 2012/0237341 A1 | 9/2012 | Simon | |
| 2012/0301296 A1 | 11/2012 | Greenblatt | |
| 2013/0206920 A1 | 8/2013 | Bichler | |
| 2013/0266436 A1 | 10/2013 | Ibaraki | |
| 2014/0286746 A1 | 9/2014 | Nichols | |
| 2014/0286787 A1 * | 9/2014 | Philipsen | F03D 1/0633 |
| | | | 416/236 R |
| 2014/0369812 A1 | 12/2014 | Caruel | |
| 2016/0009374 A1 | 1/2016 | Glezer | |
| 2016/0010652 A1 | 1/2016 | Lim | |
| 2016/0040654 A1 * | 2/2016 | Cuoghi | F03D 7/042 |
| | | | 416/61 |
| 2016/0368339 A1 | 12/2016 | Nam | |
| 2017/0033451 A1 | 2/2017 | Lim | |
| 2017/0137116 A1 | 5/2017 | Ireland | |
| 2017/0159667 A1 | 6/2017 | Streit | |
| 2017/0211545 A1 | 7/2017 | Saddoughi | |
| 2017/0355450 A1 | 12/2017 | Zha | |
| 2017/0355451 A1 * | 12/2017 | Zha | B64C 21/08 |
| 2018/0251211 A1 | 9/2018 | Zha | |
| 2018/0363676 A1 | 12/2018 | Kroger | |
| 2018/0363677 A1 | 12/2018 | Kroger | |
| 2019/0127042 A1 * | 5/2019 | Zha | B64C 3/36 |
| 2019/0226350 A1 | 7/2019 | Zha | |
| 2019/0285051 A1 * | 9/2019 | Thomsen | F03D 7/0276 |
| 2019/0389588 A1 | 12/2019 | Zha | |
| 2020/0115019 A1 | 4/2020 | Malpede et al. | |
| 2021/0284319 A1 | 9/2021 | Zha | |
| 2022/0177097 A1 | 6/2022 | Bermudez et al. | |
| 2022/0307462 A1 | 9/2022 | Zha | |
| 2024/0018903 A1 | 1/2024 | Joret et al. | |

FOREIGN PATENT DOCUMENTS

| | | | | |
|---|---|---|---|---|
| CN | 104149967 B | | 5/2015 | |
| CN | 106593786 A | | 4/2017 | |
| CN | 111734577 A | * | 10/2020 | F03D 1/0675 |
| DE | 10328540 | | 2/2008 | |
| DE | 202011051844 U1 | | 11/2011 | |
| EP | 2320076 A2 | | 5/2011 | |
| EP | 2333317 A2 | | 6/2011 | |
| EP | 2469076 A2 | | 6/2012 | |
| EP | 3254961 A1 | | 12/2017 | |
| EP | 3498596 | | 6/2019 | |
| FR | 3035861 A1 | | 11/2016 | |
| GB | 2564884 A | * | 1/2019 | F03D 1/06 |
| JP | 2013137006 | | 7/2013 | |
| KR | 20140029849 A | * | 3/2014 | F03D 1/0683 |
| WO | 2007035758 A1 | | 3/2007 | |

(56) References Cited

FOREIGN PATENT DOCUMENTS

| WO | 2018095496 A1 | 5/2018 | |
|---|---|---|---|
| WO | WO-2020165663 A1 * | 8/2020 | ........... F03D 1/0633 |
| WO | 2021158106 A1 | 8/2021 | |

OTHER PUBLICATIONS

International Search Report and Written Opinion, Application No. PCT/IB2020/050373, dated May 6, 2020.
"Fundamentals of Gas Turbine Engines" 2012; https://web.archive.org/web/20120905202602/https://www.cast-safety.org/pdf/3_engine_fundamentals.pdf (Year: 2012). 14 pages.
Espacenet, Patent Translate of DE202011051844, pp. 1-9, retrieved from Internet Apr. 11, 2018.
European Communication pursuant to Article 94(3) EPC, Application No. 18202156.8, dated Mar. 31, 2021. 6 pages.
European Patent Office, "Extended European Search Report" for EP application No. 18202156.8 mailed on Apr. 2, 2019, pp. 1-11.
European Patent Office, Extended European Search Report for Application No. 17175582.0, dated Nov. 9, 2017, pp. 1-5.
European Patent Office. "Extended European Search Report" for EP application No. 19181825.1, dated Oct. 30, 2019, pp. 1-7.
World Intellectual Property Organization, English Translation of CN 104149967, retrieved from Internet Oct. 4, 2019, pp. 1-4.
World Intellectual Property Organization, English Translation of CN 104176241, retrieved from Internet Oct. 2, 2019, pp. 1-7.
PCT International Search Report and Written Opinion, Application No. PCT/US2022/021540, dated Jun. 24, 2022.
Boeing, "About the Boeing 737 Max" Online. Apr. 1, 2015; [retrieved on Sep. 14, 2022]; retrieved from the Internet URL: https://www.boeing.com/commercial/737max/.
Johnston, "Wing Flaps: How Do They Function and What Is Their Purpose?" Online. Aug. 16, 2019; [retrieved on Sep. 14, 2022], Retrieved from the Internet URL: https://calaero.edu/wing-glaps-function-and-purpose/#:-:text=Wing%20flaps%20change%20the%20shape,drag%20(used%20landing.
International Search Report and Written Opinion, Application No. PCT/US22/35707, dated Oct. 13, 2022.
PCT International Search Report and Written Opinion issued in Application No. PCT/US21/35115, mailing date Sep. 9, 2021, 19 pages.
USPTO, Non-Final Office Action, U.S. Appl. No. 17/628,258, dated Aug. 17, 2023.
Great Britain Patents Act 1977: Examination Report under Section 18(3), Application No. GB2200772.8, dated Oct. 27, 2023.
European Communication pursuant to Article 94(3), Application No. 18202156.8, dated Nov. 16, 2023.
Ren, "Simulation of 3D Co-Flow Jet Airfoil with Embedded Micro-Compressor Actuator", AIAA SciTech Forum, (2018), pp. 1-17, retrieved from the internet, URL: https://acfdlab.miami.edu/publications/aiaa-2018-0330.pdf.
Zha, "Super-Lift and Thrusting Airfoil of Coflow Jet Actuated by Micro-Compressors", AIAA Aviation Forum, (2018), pp. 1-17, retrieved from the internet, URL: https://acfdlab.miami.edu/publications/aiaa-paper-2018-3061.pdf.
European Communication pursuant to Rule 114(2), Third Party Observation for Application No. EP20180202156, dated Nov. 13, 2023.
Antcliff et al., "Baseline Assumptions and Future Research Areas for Urban Air Mobility Vehicles", AIAA SciTech Forum, (2019), pp. 1-18.
USPTO, Non-Final Office Action, U.S. Appl. No. 17/854,499, dated Oct. 4, 2023.
PCT International Preliminary Report on Patentability, Application No. PCT/US2022/021540, mailed Oct. 5, 2023.
Great Britain Patent Act 1977: Examination Report under Section 18(3), Application No. GB2200772.8, dated Jul. 27, 2023.
PCT International Preliminary Report on Patentability, Application No. PCT/US2020/043022, dated Sep. 29, 2020.
Great Britain Patents Act 1977: Examination Report under section 18(3), Application No. GB2400074.7, dated Jun. 24, 2024.
International Preliminary Report on Patentability, Application No. PCT/US2022/035707, mailed Jan. 11, 2024.
Danish Patent and Trademark Office 1st technical examination, Application No. PA 2023 70542, dated Aug. 28, 2024.
PCT International Search Report and Written Opinion, Application No. PCT/US23/82492, dated Apr. 8, 2024.
U.S. Office Action (Non-Final rejection), U.S. Appl. No. 18/085,946, dated May 22, 2024.

* cited by examiner

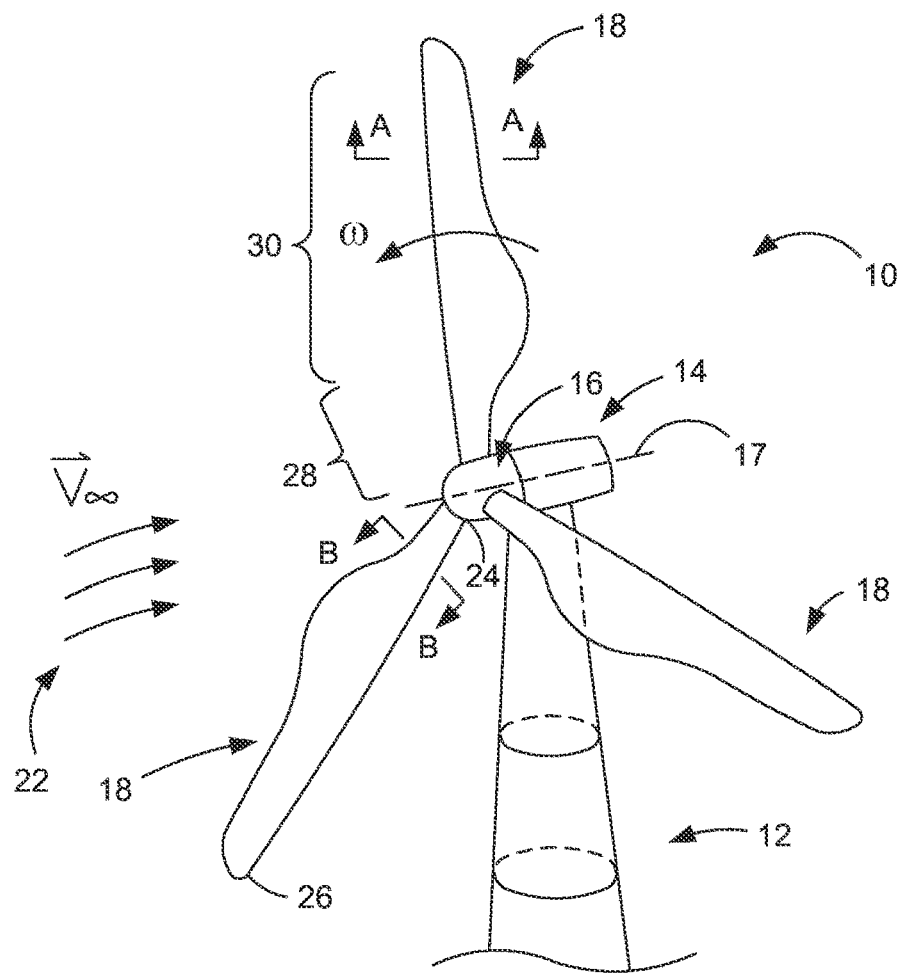
FIG.1 - Prior Art
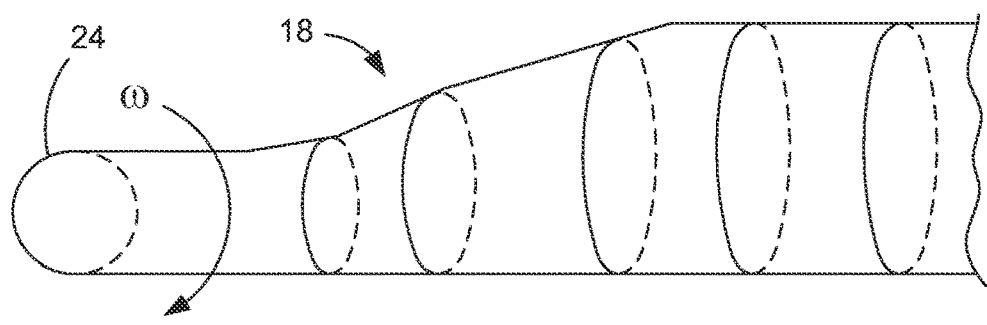
FIG.2 - Prior Art

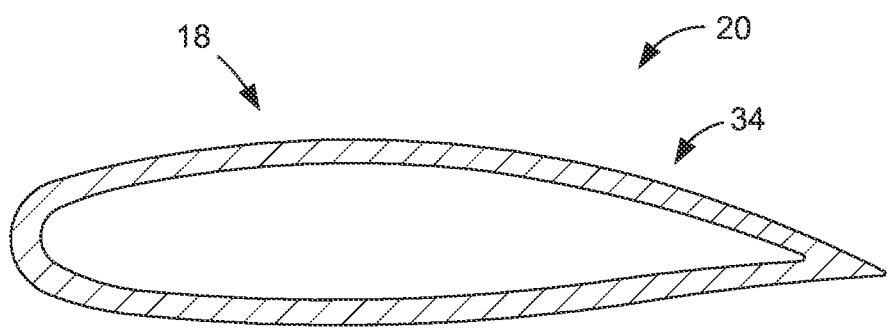
FIG.3 - Prior Art
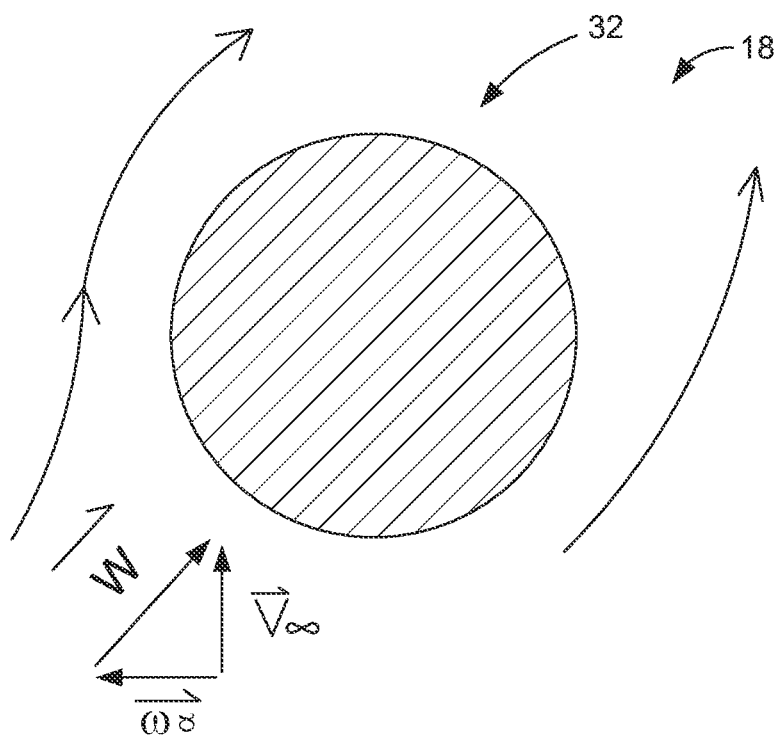
FIG.4 - Prior Art

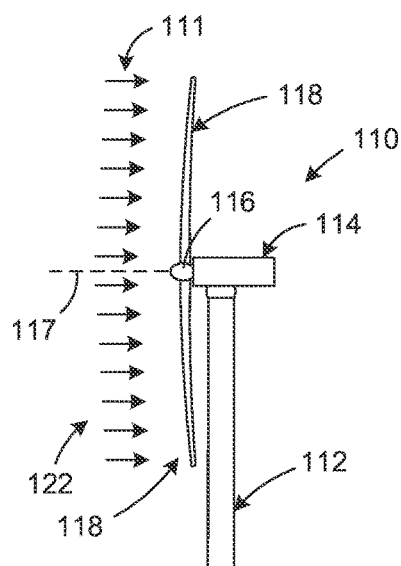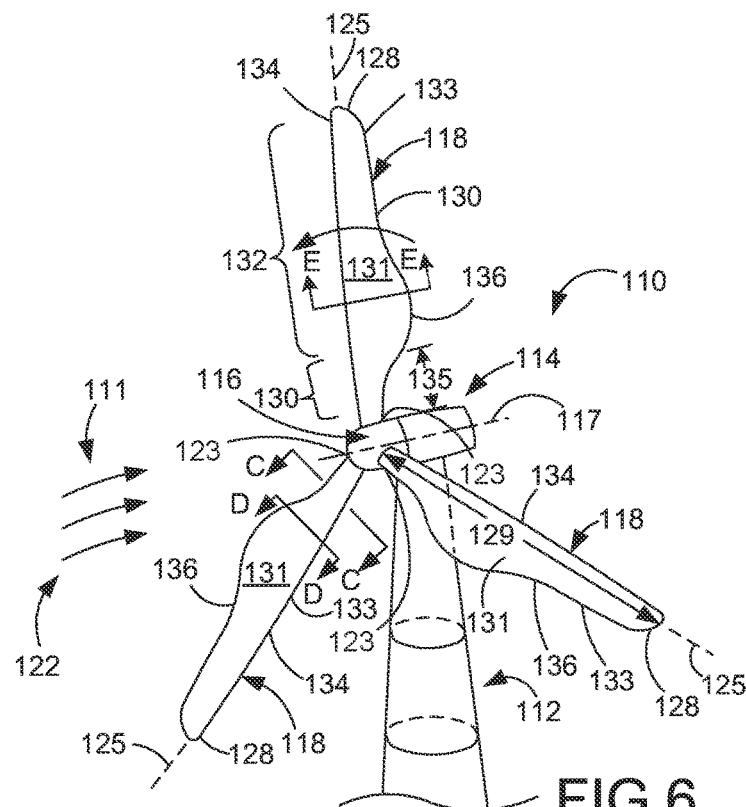

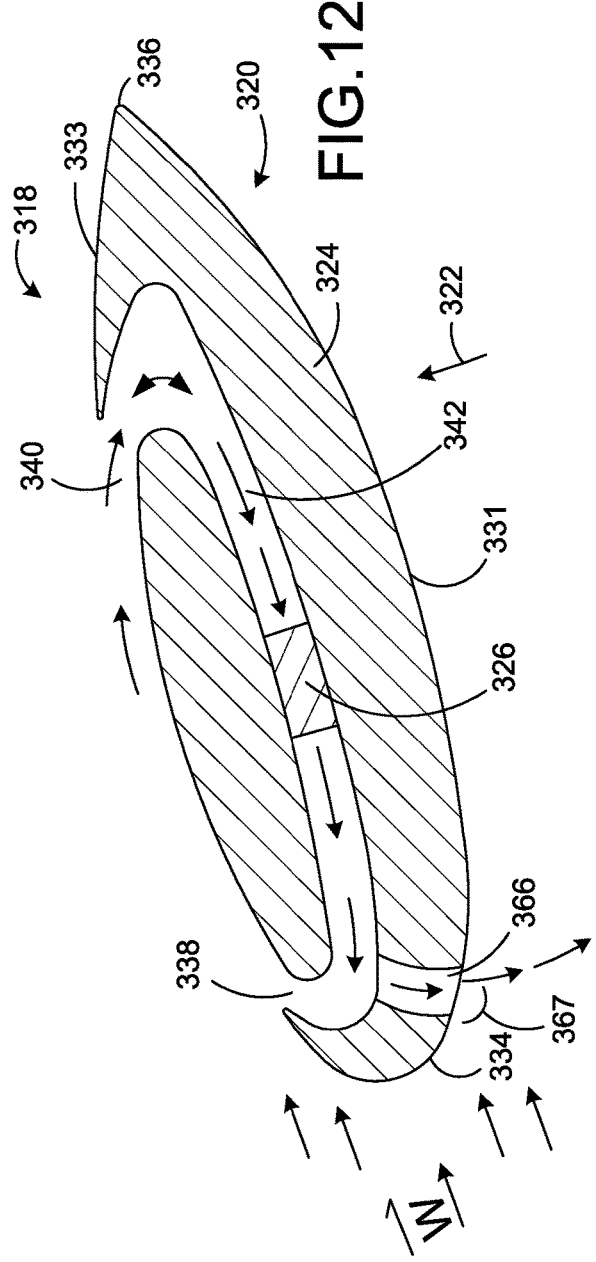
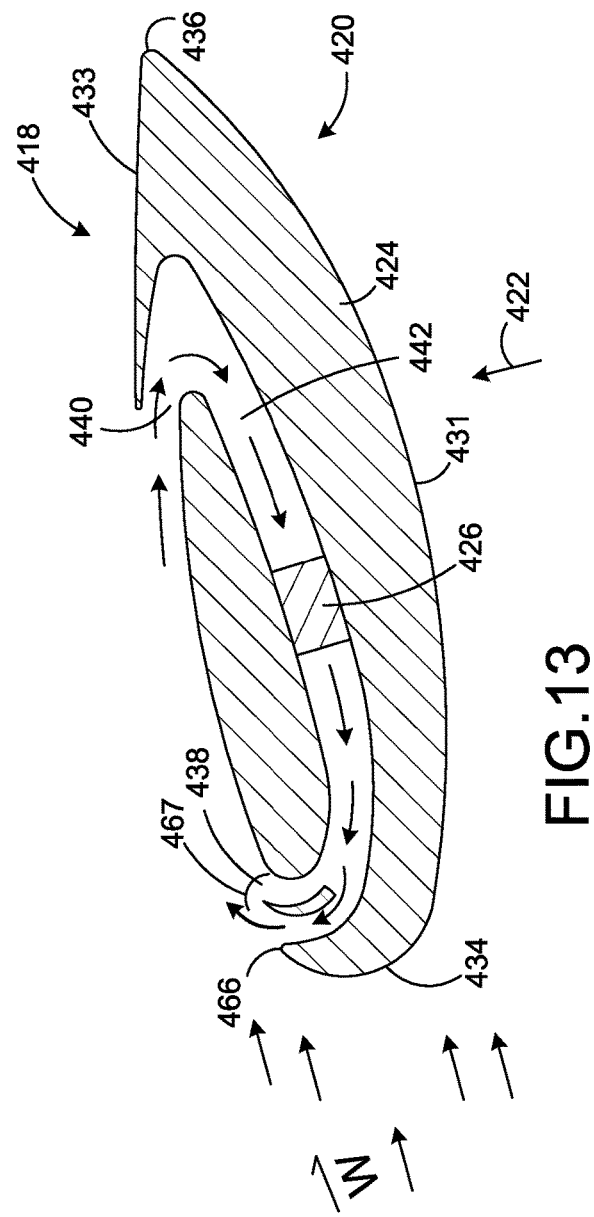

WIND TURBINE BLADES AND WIND TURBINE SYSTEMS THAT INCLUDE A CO-FLOW JET

RELATED APPLICATION

This application claims the benefit of U.S. Provisional Application No. 63/166,341, filed Mar. 26, 2021. The entire disclosure of this related application is hereby incorporated into this disclosure by reference.

FIELD

The disclosure relates generally to the field of fluid systems. More particularly, the disclosure relates to wind turbine blades and wind turbine systems that include a co-flow jet.

BACKGROUND

A conventional horizontal axis wind turbine 10 (HAWT), as shown in FIGS. 1 through 4, has a tower 12, a nacelle 14, which can include a gear box and generator, a hub 16, and blades 18. The hub 16 has a central axis 17 around which the blades 18 are disposed. As shown in FIG. 3, each blade 18 has a cross-section that defines an airfoil 20 that assists with rotating the blade 18 about the central axis 17 when wind 22 is directed toward the wind turbine 10 such that energy can be produced by the generator. Each blade 18 has a root 24, a tip 26, a first portion 28, and a second portion 30. The first portion 28 has a cylindrical cross-sectional shape 32, as shown in FIG. 4, and the second portion 30 has a cross-sectional shape that defines an airfoil 34, as shown in FIG. 3. The overall structural arrangement of conventional blades that are included on wind turbine systems has drawbacks. For example, since the first portion 28 does not have a cross-sectional shape that defines an airfoil, it has a low power generation efficiency. Furthermore, the blades included on conventional HAWTs have high cut in speeds and require load and efficiency controlling (e.g., rotor yaw control, blade pitch control) that varies depending on the direction and speed of the wind 22 directed toward the wind turbine 10.

A need exists, therefore, for new and useful wind turbine blades and wind turbine systems that address these deficiencies.

Summary of Selected Example Embodiments

Various examples of wind turbine blades and wind turbine systems that include a co-flow jet are described herein.

An example wind turbine blade has a main body and a fluid pressurizer. The main body has a first portion, a second portion, a leading edge, a trailing edge, an injection opening, a suction opening, and a channel. The first portion has a first cross-sectional shape and the second portion has a second cross-sectional shape that is different than the first cross-sectional shape. The injection opening is disposed on the first portion between the leading edge and the trailing edge. The channel extends from the suction opening to the injection opening. The fluid pressurizer is disposed within the channel.

Another example wind turbine blade has a main body and a plurality of fluid pressurizers. The main body has a front, wind facing surface, a rear surface, a first portion, a second portion, a leading edge, a trailing edge, a plurality of injection openings, a plurality of suction openings, and a plurality of channels. The first portion has a first cylindrical cross-sectional shape and the second portion has a second cross-sectional shape that is different than the first cylindrical cross-sectional shape. Each injection opening of the plurality of injection openings is disposed on the rear surface between the leading edge and the trailing edge. Each suction opening of the plurality of suction openings is disposed on the rear surface. Each channel of the plurality of channels extends from a suction opening of the plurality of suction openings to an injection opening of the plurality of injection openings. A fluid pressurizer of the plurality of fluid pressurizers is disposed within each channel of the plurality of channels.

An example wind turbine system has a tower, a nacelle attached to the tower, a hub attached to the nacelle, and a blade attached to the hub. The blade has a main body and a plurality of fluid pressurizers. The main body has a front, wind facing surface, a rear surface, a first portion, a second portion, a leading edge, a trailing edge, a plurality of injection openings, a plurality of suction openings, and a plurality of channels. The first portion has a first cylindrical cross-sectional shape and the second portion has a second cross-sectional shape that is different than the first cylindrical cross-sectional shape. Each injection opening of the plurality of injection openings is disposed on the rear surface between the leading edge and the trailing edge. Each suction opening of the plurality of suction openings is disposed on the rear surface. Each channel of the plurality of channels extends from a suction opening of the plurality of suction openings to an injection opening of the plurality of injection openings. A fluid pressurizer of the plurality of fluid pressurizers is disposed within each channel of the plurality of channels.

Additional understanding of the example wind turbine blades and wind turbine systems that include a co-flow jet can be obtained by review of the detailed description, below, and the appended drawings.

BRIEF DESCRIPTION OF THE DRAWINGS

FIG. 1 is a partial perspective view of a conventional wind turbine system subjected to a fluid flow field.

FIG. 2 is a partial perspective view of a blade included in the wind turbine system illustrated in FIG. 1.

FIG. 3 is a cross-sectional view of a blade included in the wind turbine system illustrated in FIG. 1 taken along line A-A.

FIG. 4 is a cross-sectional view of a blade of included in the wind turbine system illustrated in FIG. 1 taken along line B-B.

FIG. 5 is a partial side view of an example wind turbine system that includes a co-flow jet.

FIG. 6 is a partial perspective view of the wind turbine system illustrated in FIG. 5.

FIG. 7 is a partial sectional view of a blade included in the wind turbine system illustrated in FIG. 5.

FIG. 7A is a side view of an example rib that can be included in a wind turbine blade.

FIG. 12 is a cross-sectional view of another blade that can be included in a wind turbine system.

FIG. 13 is a cross-sectional view of another blade that can be included in a wind turbine system.

DETAILED DESCRIPTION

Figure 8:
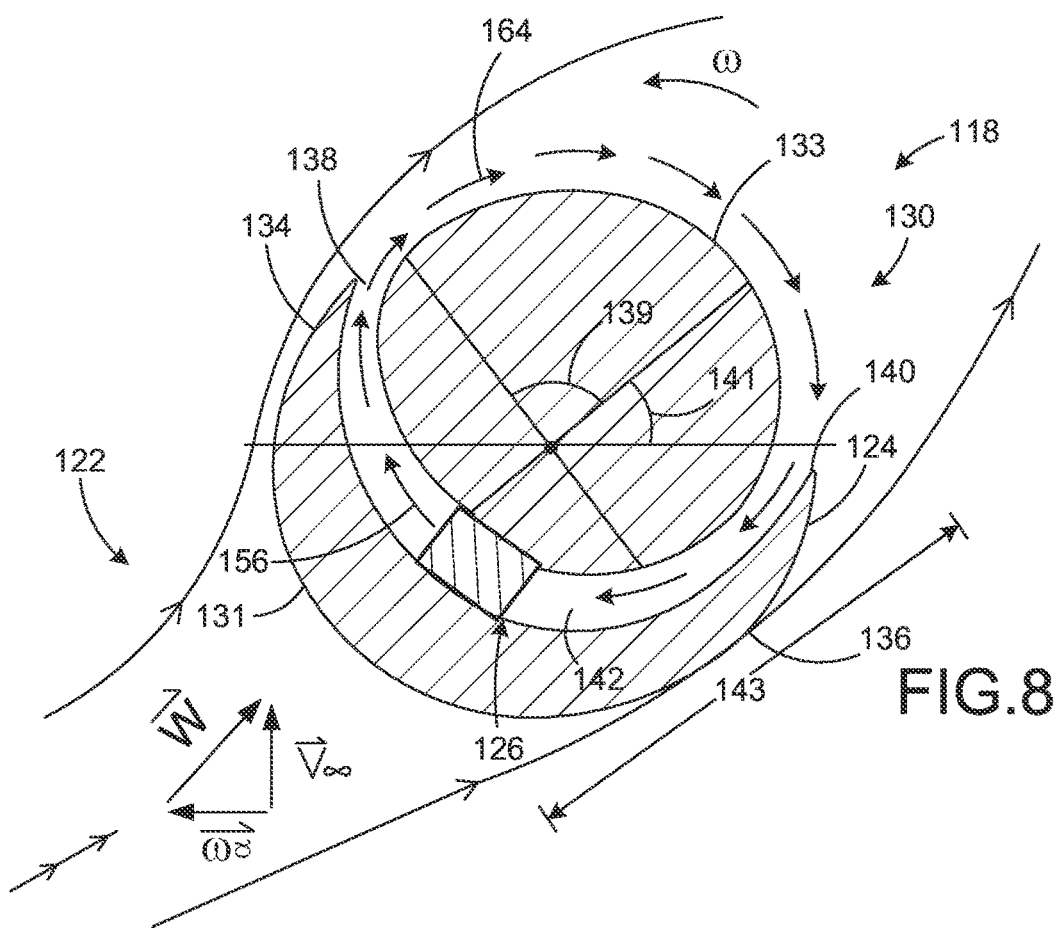
FIG. 8 is a cross-sectional view of a blade included in the wind turbine system illustrated in FIG. 5 taken along line C-C.
Figure 9:
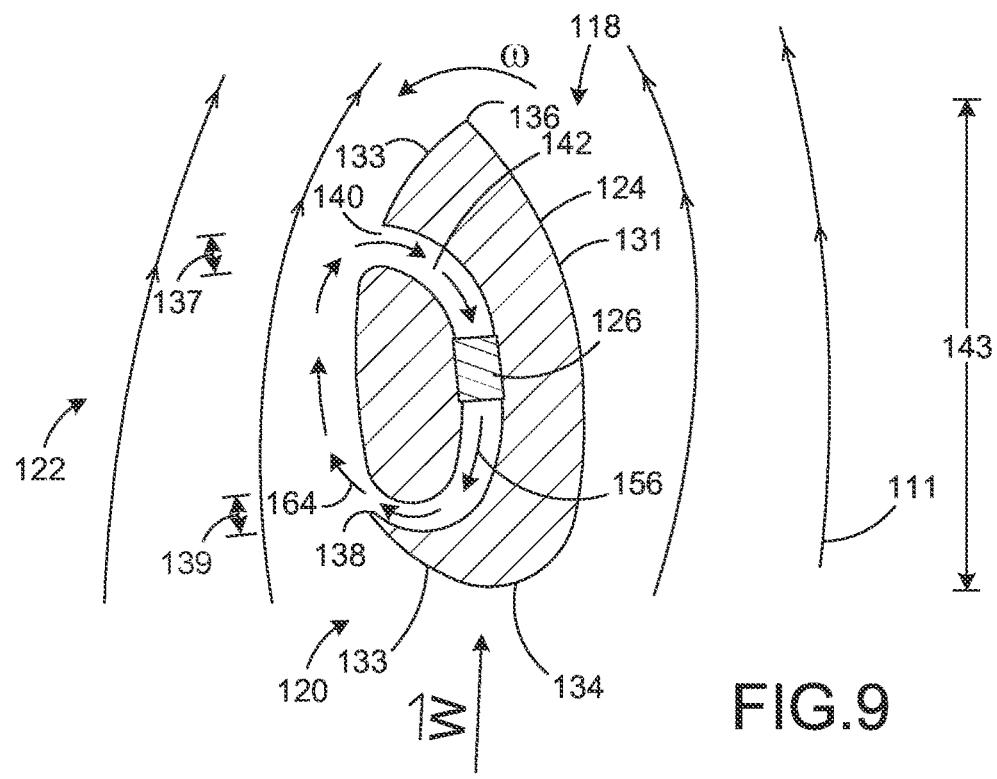
FIG. 9 is a cross-sectional view of a blade included in the wind turbine system illustrated in FIG. 5 taken along line D-D.

The following detailed description and the appended drawings describe and illustrate various example embodiments of wind turbine blades and wind turbine systems that include a co-flow jet. The description and illustration of these examples are provided to enable one skilled in the art to make and use a wind turbine blade that includes a co-flow jet and a wind turbine system that includes a co-flow jet. They are not intended to limit the scope of the claims in any manner. The invention is capable of being practiced or carried out in various ways and the examples described and illustrated herein are merely selected examples of the various ways of practicing or carrying out the invention and are not considered exhaustive.

As used herein, the term "diameter" refers to the length of a straight line passing through the center of a body, element, or feature from one surface of the body, element, or feature, to another surface of the body, element, or feature and does not impart any structural configuration on the body, element, or feature.

FIGS. 5 through 10 illustrate a first example wind turbine system 110 that includes a co-flow jet. As shown in FIGS. 5 through 9, the wind turbine system 110 is subjected to a fluid flow field 111. The wind turbine system 110 has a tower 112, a nacelle 114 attached to the tower 112, which includes a conventional gear box and generator attached to the gear box, a hub 116 attached to the nacelle (e.g., gear box, generator), and a plurality of blades 118 attached to the hub 116. Alternative embodiments, however, can include any suitable structure within a nacelle to accomplish power generation (e.g., can omit a gear box). The hub 116 has a central axis 117 around which the plurality of blades 118 is disposed. As shown in in FIG. 9, each blade 118 has a cross-section that defines an airfoil 120 that assists with rotating the blade 118 about the central axis 117 when the fluid flow field 111, or wind 122, is directed toward the wind turbine 110 such that energy can be produced by the generator. As shown in FIG. 5, the wind turbine system 110 is an upwind wind turbine system 110 in which the blades 118 are positioned between the incoming wind 122 and the tower 112.

Figure 10:
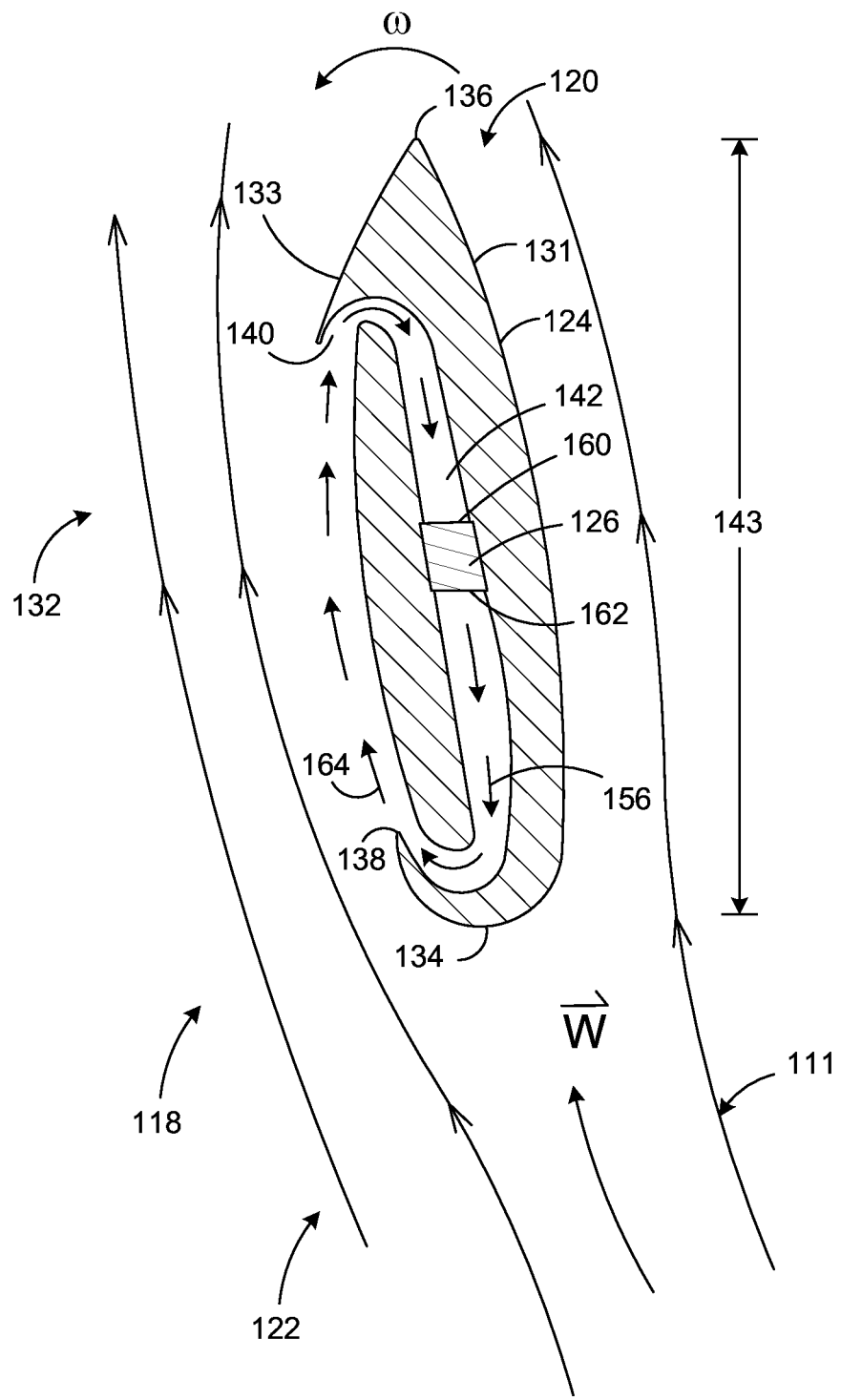
FIG. 10 is a cross-sectional view of a blade included in the wind turbine system illustrated in FIG. 5 taken along line E-E.

In the illustrated embodiment, each blade of the plurality of 118 has a main body 124 and a plurality of fluid pressurizers 126. The main body 124 has a lengthwise axis 125, a root 123, a tip 128, a length 129, a first portion 130, a second portion 132, a leading edge 134, a trailing edge 136, a front, wind facing surface 131 (e.g., pressure surface), a rear surface 133 (e.g., suction surface), a plurality of injection openings 138, a plurality of suction openings 140, and a plurality of channels 142. The root 123 of each blade of the plurality of blades 118 is attached to the hub 116. The length 129 extends from the root 123 to the tip 128. The first portion 130 has a first cross-sectional shape and the second portion 132 has a second cross-sectional shape that is different than the first cross-sectional shape. In the embodiment illustrated, the first portion 130 has a cylindrical cross-sectional shape, as shown in FIG. 8, and the second portion 132 has a cross-sectional shape that defines an airfoil 120, as shown in FIG. 10. As shown in FIG. 7, a portion of the second portion includes a transition region 127 that transitions between the first cross-sectional shape of the first portion 130 to the second cross-sectional shape of the second portion 132. The first portion 130 extends from the root 123 toward the tip 128 and has a length 135 that is equal to about 25% of the length 129. However, alternative embodiments can include a first portion that has a length that is less than, or greater than, 25% of a length of a blade, a first portion that has a length that is less than, greater than, or equal to 25% of a radius of blade arrangement (e.g., combination of multiple blades and a hub), or any other length considered suitable for a particular embodiment.

Each injection opening of the plurality of injection openings 138 is disposed on the rear surface 133 and between the leading edge 134 and the trailing edge 136 and each suction opening of the plurality of suction openings 140 is disposed on the rear surface 133 and between an injection opening of the plurality of injection openings 138 and the trailing edge 136. Each injection opening 138 has a width 139 and each suction opening has a width 137. In the illustrated embodiment, the width 139 is between about 0.1% and about 3% of the diameter of the blade 118 (e.g., local chord, airfoil chord at a local blade span) and the width 137 is between about 0.2% and about 4% of the diameter 143 of the blade (e.g., local chord, airfoil chord at a local blade span). However, other widths are considered suitable, such as widths 139 between about 1% and about 1.5% of the diameter 143 of the blade (e.g., local chord, airfoil chord at a local blade span) and widths 137 between about 1.5% and about 3% of the diameter 143 of the blade (e.g., local chord, airfoil chord at a local blade span). Each channel of the plurality of channels 142 extends from a suction opening of the plurality of suction openings 140 to an injection opening of the plurality of injection openings 138. A first set of injection openings 144 of the plurality of injection openings 138, a first set of suction openings 146 of the plurality of suction openings 140, and a first set of channels 148 of the plurality of channels 142 are disposed on the first portion 130, as shown in FIG. 7. A second set of injection openings 150 of the plurality of injection openings 138, a second set of suction openings 152 of the plurality of suction openings 140, and a second set of channels 154 of the plurality of channels 142 are disposed on the second portion 132, as shown in FIG. 7, including on the transition region 127. However, alternative embodiments can include a blade that includes an injection opening, a suction opening, or a channel, or a plurality of injection openings, a plurality of suction openings, or a plurality of channels on only a first portion, on only a second portion, on only a transition region, on only a first portion and a transition region, on only a second portion and a transition region, or on only a first portion and a second portion.

While the main body 124 has been illustrated as including a plurality of injection openings 138, a plurality of suction openings 140, and a plurality of channels 142, a main body of a blade 118 can include any suitable number of injection openings, suction openings, and channels. Selection of a suitable number of injection openings, suction openings, and channels to include on a blade can be based on various considerations, including the intended use of the blade. Examples of numbers of injection openings, suction openings, and/or channels considered suitable to include on a main body of a blade include one, more than one, two, a plurality, three, four, five, more than five, more than ten, and any other number considered suitable for a particular embodiment. For example, an alternative embodiment can include a single injection opening, a single suction opening, and a single channel, each of which can be disposed on only a first portion of a blade, on only a second portion of a blade, or on both a first portion and a second portion of a blade.

For wind turbines, the velocity considered for aerodynamic performance is based on the relative velocity $\vec{W}$ of the wind turbine 110 $\vec{W} = \vec{V}_\infty - \overrightarrow{\omega\gamma}$ where $\vec{V}_\infty$ is the incoming free stream velocity near the wind turbine, $\overrightarrow{\omega\gamma}$ is the rotating velocity at radius $\gamma$, and $\omega$ is the angular velocity of the rotating blade. In the illustrated embodiment, as shown in FIG. 8, each injection opening 138 is disposed at an angle 139 relative to the relative velocity $\vec{W}$ and each suction opening 140 is disposed at an angle 141 relative to the relative velocity $\vec{W}$. The position of a blade 118 can be fixed, or modified during use, to accomplish these relative positions of the injection and suction openings 138, 140. In the illustrated embodiment, angle 139 is equal to about 90 degrees and angle 141 is equal to about 45 degrees. However, other angles are considered suitable, such as those between 0 degrees and 180 degrees.

A fluid pressurizer of the plurality of fluid pressurizers 126 is disposed within each channel of the plurality of channels 142. Each fluid pressurizer of the plurality of fluid pressurizers 126 is moveable between on state in which fluid flows into a suction opening 140, through a channel 142, and out of an injection opening 138 when the fluid pressurizer 126 and an off state in which fluid does not flow through the channel 142, or fluid flow is less than when the fluid pressurizer is in an on state (e.g., via ambient air). Each fluid pressurizer of the plurality of fluid pressurizers 126 provides a mechanism for pressurizing the fluid 156 passing through a channel 142 during use. In the illustrated embodiment, each fluid pressurizer of the plurality of fluid pressurizers 126 is disposed a first distance from a suction opening 140 when traveling through a channel 142 from the suction opening 140 to the fluid pressurizer 126 and a second distance from the injection opening 138 when traveling through the channel 142 from the fluid pressurizer 126 to the injection opening 138. The first distance is equal to the second distance. However, alternative embodiments can include a fluid pressurizer such that the first distance is greater than, or equal to, the second distance. A fluid pressurizer included in a fluid system can comprise any suitable device, system, or component capable of pressurizing fluid and selection of a suitable fluid pressurizer can be based on various considerations, such as the structural arrangement of a channel within which a fluid pressurizer is intended to be disposed. Examples of fluid pressurizers considered suitable to include in a fluid system include electric pumps, pneumatic pumps, hydraulic pumps, micropumps, fans, low pressure axial fans, such as HVAC fans, compressors, vacuums, blowers, such as conventional blowers for large utility wind turbines, and any other fluid pressurizer considered suitable for a particular embodiment. In the illustrated embodiment, each fluid pressurizer of the plurality of fluid pressurizers 126 is a low pressure axial fan.

In the illustrated embodiment, each fluid pressurizer of the plurality of fluid pressurizers 126 is disposed (e.g., entirely) within a channel 142, is moveable between an off state and an on state, and has a suction port 160 and a discharge port 162. Each fluid pressurizer of the plurality of fluid pressurizers 126 can be operatively connected to any suitable portion of a device, system, or component of the wind turbine system 110 to provide power to the fluid pressurizer (e.g., battery, electric motor) and to provide a mechanism for moving the fluid pressurizer between the off state and the on state (e.g., one or more switches). Alternative embodiments can include a fluid pressurizer, or plurality of fluid pressurizers, that can vary the degree to which fluid is pressurized through a channel (e.g., dynamic control) allowing for an even load along a blade such that a preferred angle of attack can be maintained along the blade length.

The inclusion of an injection opening 138, a suction opening 140, a channel 142, and a fluid pressurizer 126 provides a mechanism for pressurizing fluid that passes through the channel 142 such that it forms a jet of fluid 164 (e.g., co-flow jet) as the fluid exits the injection opening 138, which increases lift, reduces drag, and increases nose-down pitching moment such that the overall power output of the wind turbine 110 is increased. In addition, the creation of a jet of fluid 164 provides a mechanism for reducing, or eliminating, flow separation (e.g., when there is a gust of wind), increasing the low speed efficiency of the wind turbine 110, decreasing the cut in speed of the wind turbine 110, providing a blade pitching control (blade rotation about the blade span axis) by aerodynamic force, and providing the turbine rotor yaw control by different drag on each blade. Furthermore, in situations in which a random flow of wind 122 is applied to a portion of a blade, dynamic control of a fluid pressurizer within that portion of the blade can control the magnitude of the jet of fluid 164 to interrupt flow and reduce the blade load. Moreover, the inclusion of one or more injection openings, suction openings, channels, and fluid pressurizers along a first portion of a blade increases the power output along the first portion, which without the inclusion of these features has little, to no, power output.

Each fluid pressurizer of the plurality of fluid pressurizers 126 is attached to the main body 124 and is positioned such that the suction port 160 is directed toward a first portion of the channel 142 that extends from the suction opening 140 to the fluid pressurizer 126 (e.g., the suction port 160 is directed toward the suction opening 140) and the discharge port 162 is directed toward a second portion of the channel 142 that extends from the injection opening 138 to the fluid pressurizer 126 (e.g., the discharge port 162 is directed toward the injection opening 138). In the off state, each fluid pressurizer of the plurality of fluid pressurizers 126 does not pressurize fluid passing through the channel 142 within which it is disposed. In the on state, each fluid pressurizer of the plurality of fluid pressurizers 126 draws fluid through the suction opening 140 downstream from the injection opening 138, through the fluid pressurizer 126, pressurizes the fluid, and pushes fluid out of the discharge port 162 and the injection opening 138. When in the on state, the fluid entering the channel 142 at the suction opening 140 has a first velocity and the fluid exiting the channel 142 at the injection opening 138 has a second velocity that is greater than the first velocity and is directed tangential to the main body 124. However, alternative embodiments can define an injection opening that directs fluid exiting the injection opening such that it is directed at any suitable angle relative to the main body (e.g., between about 0 degrees and about 180 degrees relative to a main body). The fluid entering the fluid pressurizer 126 has a first pressure and the fluid exiting the fluid pressurizer 126 has a second pressure that is greater than the first pressure.

A fluid pressurizer can be attached to a main body using any suitable technique or method of attachment and selection of a suitable technique or method of attachment between a fluid pressurizer and a main body can be based on various considerations, including the material(s) that forms the fluid pressurizer and/or the main body. Examples of techniques and methods of attachment considered suitable include welding, fusing, using adhesives, mechanical connectors, and any other technique or method considered suitable for a particular embodiment. In the illustrated embodiment, each fluid pressurizer of the plurality of fluid pressurizers 126 is attached to the main body 124 using mechanical connectors (e.g., screws, bolts).

While the main body 124 has been illustrated as having a particular structural configuration and as being formed as a single piece of material, a main body of a fluid system can have any suitable structural configuration and be formed of any suitable number of pieces of material. Selection of a suitable structural arrangement for a main body and number of pieces of material to form a main body of a blade can be based on various considerations, including the intended use of the blade. Examples of numbers of pieces of material considered suitable to form a main body include one, at least one, two, a plurality, three, four, five, more than five, multiple pieces of material, and any other number considered suitable for a particular embodiment. When formed of multiple pieces of material, each piece forming a main body can be attached to another piece of material forming a main body using any suitable technique or method of attachment. As shown in FIG. 7, a main body can optionally include one or more ribs 170 to add to the strength of the blade 118 structure for torsional load inside the blade 118. An example rib 170 is illustrated in FIG. 7A. A rib included in a main body can have any suitable thickness (e.g., between about 0.01 millimeters to about 100 millimeters, between about 1 millimeter to about 5 millimeters). A rib included in a main body can have any structural arrangement, such as those that can be tightly integrated with a blade and that follows the internal shape of the blade. In addition, as shown in FIG. 7A, a rib 170 can optionally include one or more passageways 172 that extend through a thickness of the rib 170 such that a spar can be passed through a passageway 172 along the span of the blade 118.

An injection opening, suction opening, and/or channel can be formed by a main body of a blade or a separate member (e.g., duct) that is attached to a main body of a blade. Furthermore, an injection opening and/or suction opening can optionally move between open and closed configurations. Examples of various configurations for injection openings, suction openings, channels and other corresponding components (e.g., that accomplish movement of openings between open and closed configuration) are described in U.S. patent application Ser. No. 15/255,523 by Zha and filed on Sep. 2, 2016, U.S. patent application Ser. No. 15/426,084 by Zha and filed on Feb. 7, 2017, U.S. patent application Ser. No. 16/135,120 by Zha and filed on Sep. 19, 2018, and U.S. patent application Ser. No. 16/445,822 by Zha and filed on Jun. 19, 2019, each of which is incorporated by reference herein in its entirety. For example, an injection opening and suction opening can move between open and closed configurations by translating a central portion of a main body relative to an outer portion of the main body such that when the central portion is in a first position (e.g., outermost position) the injection and suction openings are closed and when the central portion is in a second position (e.g., disclosed closer to center of main body relative to first position) the injection and suction openings are open. Such translation can be between about 0.1% and about 1% of a diameter of a main body.

Figure 11:
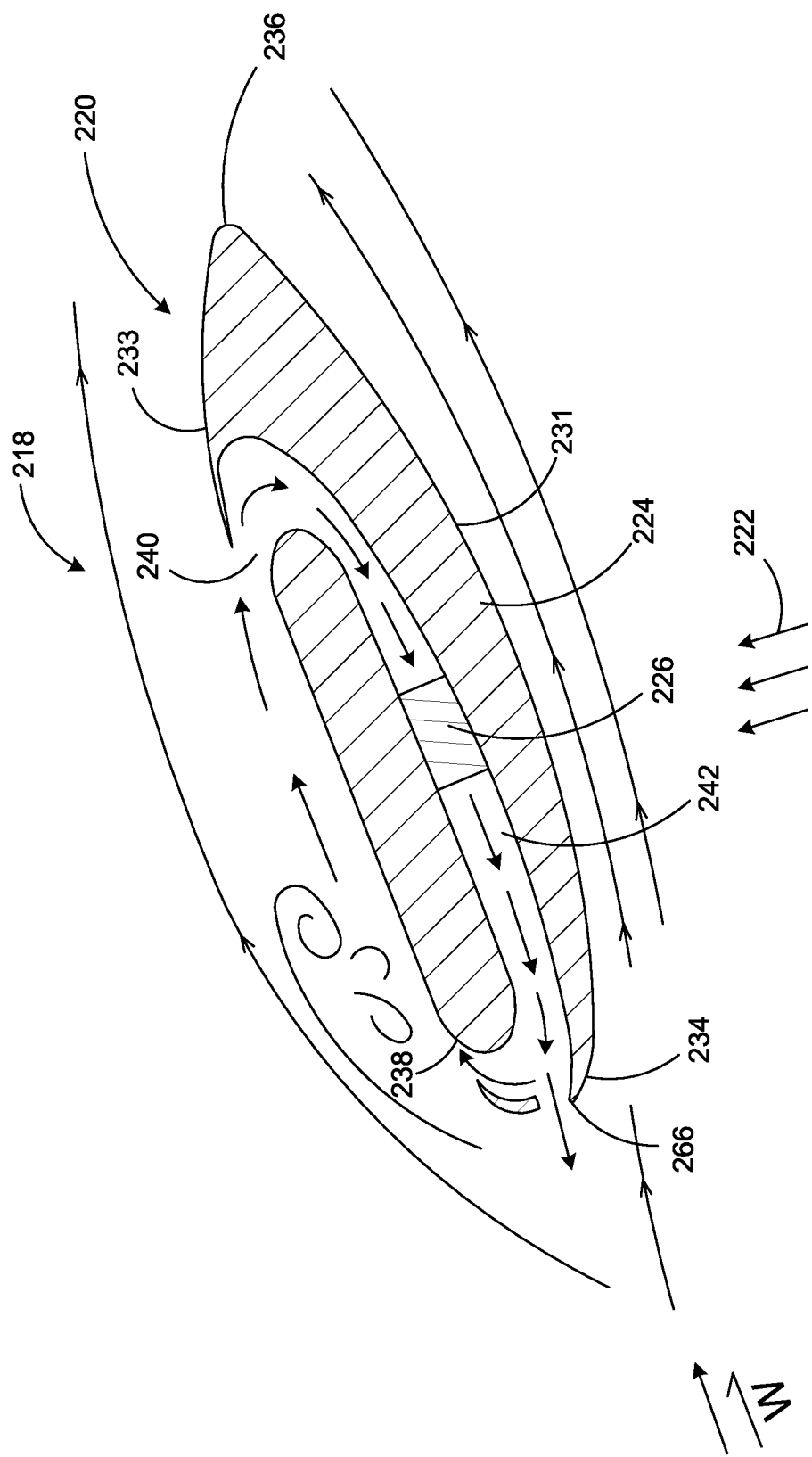
FIG. 11 is a cross-sectional view of another blade that can be included in a wind turbine system.

FIG. 11 illustrates another example blade 218 that includes a co-flow jet and can be included in a wind turbine system. The blade 218 has a cross-section that defines an airfoil 220 that assists with rotating the blade 218 when wind 222 is directed toward the blade 218 such that energy can be produced by a generator.

In the illustrated embodiment, the blade 218 has a main body 224 and a fluid pressurizer 226. The main body 224 has a leading edge 234, a trailing edge 236, a front, wind facing surface 231, a rear surface 233, a first injection opening 238, a suction opening 240, a channel 242, and a second injection opening 266.

The first injection opening 238 is disposed on the rear surface 233 between the leading edge 234 and the trailing edge 236, the suction opening 240 is disposed on the rear surface 233 between the first injection opening 238 and the trailing edge 236, and the second injection opening 266 is disposed on the leading edge 234. The channel 242 extends from the suction opening 240 to the first injection opening 238 and is in communication with the second injection opening 266. The first injection opening 238, suction opening 240, and second injection opening 266 can be opened and closed such that if the flow speed it too large for the structure load, the second injection opening 266 can be opened, while the suction opening 240 is opened and the first injection opening 238 is opened or closed, such that fluid can be directed outwardly from the leading edge 234 and opposite to the incoming relative flow speed to create large flow separation, increase drag, reduce the lift and force on the structure, and reduce power output. In addition, this arrangement can be used to control the blade pitch motion by generating a different pitching moment on each blade and/or control the rotor yaw motion by generating different drag on each blade.

FIG. 12 illustrates another example blade 318 that includes a co-flow jet and can be included in a wind turbine system. The blade 318 has a cross-section that defines an airfoil 320 that assists with rotating the blade 318 when wind 322 is directed toward the blade 318 such that energy can be produced by a generator.

In the illustrated embodiment, the blade 318 has a main body 324 and a fluid pressurizer 326. The main body 324 has a leading edge 334, a trailing edge 336, a front, wind facing surface 331, a rear surface 333, a first injection opening 338, a suction opening 340, a channel 342, and a second injection opening 366.

The first injection opening 338 is disposed on the rear surface 333 between the leading edge 334 and the trailing edge 336, the suction opening 340 is disposed on the rear surface 333 between the first injection opening 338 and the trailing edge 336, and the second injection opening 366 is disposed on the front surface 331 between the leading edge 334 and the trailing edge 336. The channel 342 extends from the suction opening 340 to the first injection opening 338 and is in communication with the second injection opening 366. The first injection opening 338, suction opening 340, and second injection opening 366 can be opened and closed such that if the flow speed it too large for the structure load, the second injection opening 366 can be opened, while the suction opening 340 is opened and the first injection opening 338 is opened or closed, such that fluid can be directed outwardly from the blade 318 at an angle 367 that is perpendicular to the incoming relative flow to create large flow separation, increase drag, reduce the lift and force on the structure, and reduce power output. In addition, this arrangement can be used to control the blade pitch motion by generating a different pitching moment on each blade and/or control the rotor yaw motion by generating different drag on each blade.

FIG. 13 illustrates another example blade 418 that includes a co-flow jet and can be included in a wind turbine system. The blade 418 has a cross-section that defines an airfoil 420 that assists with rotating the blade 418 when wind 422 is directed toward the blade 418 such that the blade pitch motion and the rotor yaw motion can be controlled and energy can be produced by a generator.

In the illustrated embodiment, the blade 418 has a main body 424 and a fluid pressurizer 426. The main body 424 has a leading edge 434, a trailing edge 436, a front, wind facing surface 431, a rear surface 433, a first injection opening 438, a suction opening 440, a channel 442, and a second injection opening 466.

The first injection opening 438 is disposed on the rear surface 433 between the leading edge 434 and the trailing edge 436, the suction opening 440 is disposed on the rear surface 433 between the first injection opening 438 and the trailing edge 436, and the second injection opening 466 is disposed between the leading edge 434 and the first injection opening 438. The channel 442 extends from the suction opening 440 to the first injection opening 438 and is in communication with the second injection opening 466. The first injection opening 438, suction opening 440, and second injection opening 466 can be opened and closed such that if the flow speed it too large for the structure load, the second injection opening 466 can be opened, while the suction opening 440 is opened and the first injection opening 438 is opened or closed, such that fluid can be directed from the blade 418 at an angle 467 that is perpendicular to the incoming relative flow to create large flow separation, increase drag, reduce the lift and force on the structure, and reduce power output. In addition, this arrangement can be used to control the blade pitch motion by generating a different pitching moment on each blade and/or control the rotor yaw motion by generating different drag on each blade.

Figure 14:
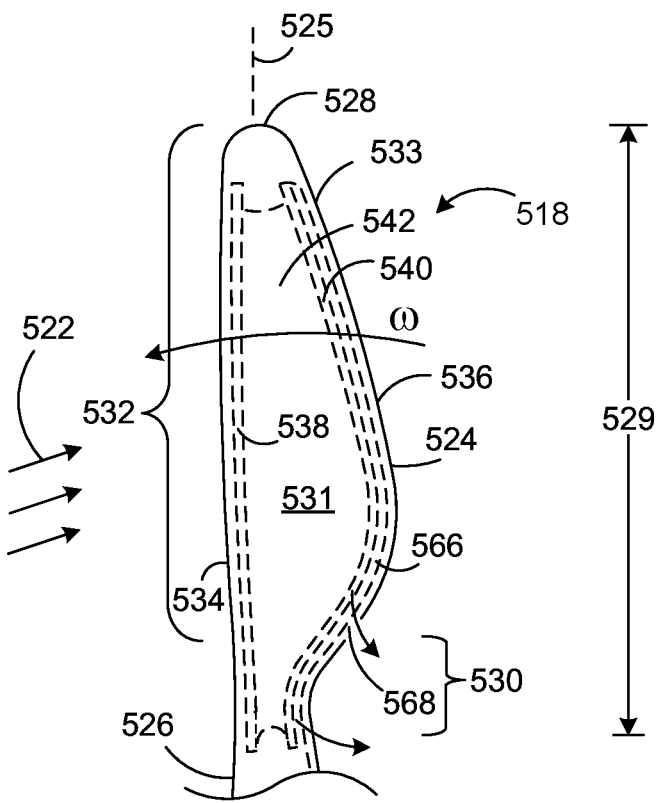
FIG. 14 is a partial front view of another blade that can be included in a wind turbine system.
Figure 15:
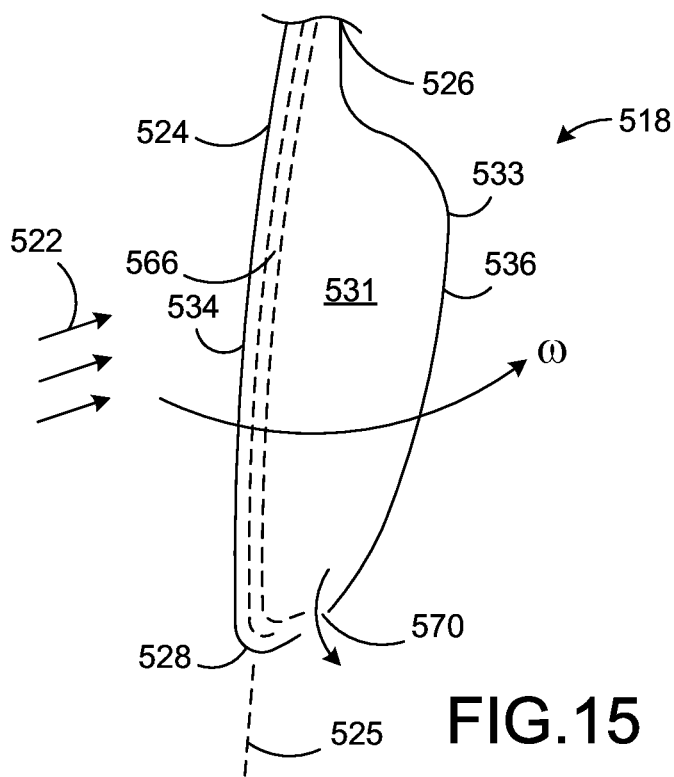
FIG. 15 is another partial front view of the blade illustrated in FIG. 14.

FIGS. 14 and 15 illustrate another example blade 518 that includes a co-flow jet and can be included in a wind turbine system. The blade 518 has a structural configuration that assists with rotating the blade 518 when wind 522 is directed toward the blade 518 such that energy can be produced by a generator.

In the illustrated embodiment, the blade 518 has a main body 524 that has a lengthwise axis 525, a root 526, a tip 528, a length 529, a first portion 530, a second portion 532, a leading edge 534, a trailing edge 536, a front, wind facing surface 531, a rear surface 533, an injection opening 538, a suction opening 540, and a channel 542, a cavity 566, a first debris opening 568, and a second debris opening 570.

The injection opening 538 is disposed on the rear surface 533 between the leading edge 534 and the trailing edge 536, the suction opening 540 is disposed on the rear surface 533 between the injection opening 538 and the trailing edge 536, the cavity 566 extends from the channel 542 to the first debris opening 568 and the second debris opening 570, the first debris opening 568 is disposed adjacent to the root 526, and the second debris opening 570 is disposed adjacent to the tip 528. Alternative embodiments, however, can include a first debris opening that is disposed on a root and/or a second debris opening that is disposed on a tip. The first debris opening 568 and the second debris opening 570 can be opened and closed such that if debris accumulates in the channel 542 and/or cavity 566 the debris can be removed by opening the first debris opening 568 and/or second debris opening 570. For example, when the wind turbine system is in use, the second debris opening 570 can be opened allowing centripetal force to assist with the removal of the debris. Alternatively, the first debris opening 568 and/or second debris opening 570 can be opened when a blade is positioned as shown in FIG. 14 or 15 to assist with removal of debris. After debris has been removed, the openings 568, 570 can be closed such that the system can function, as described herein.

Figure 16:
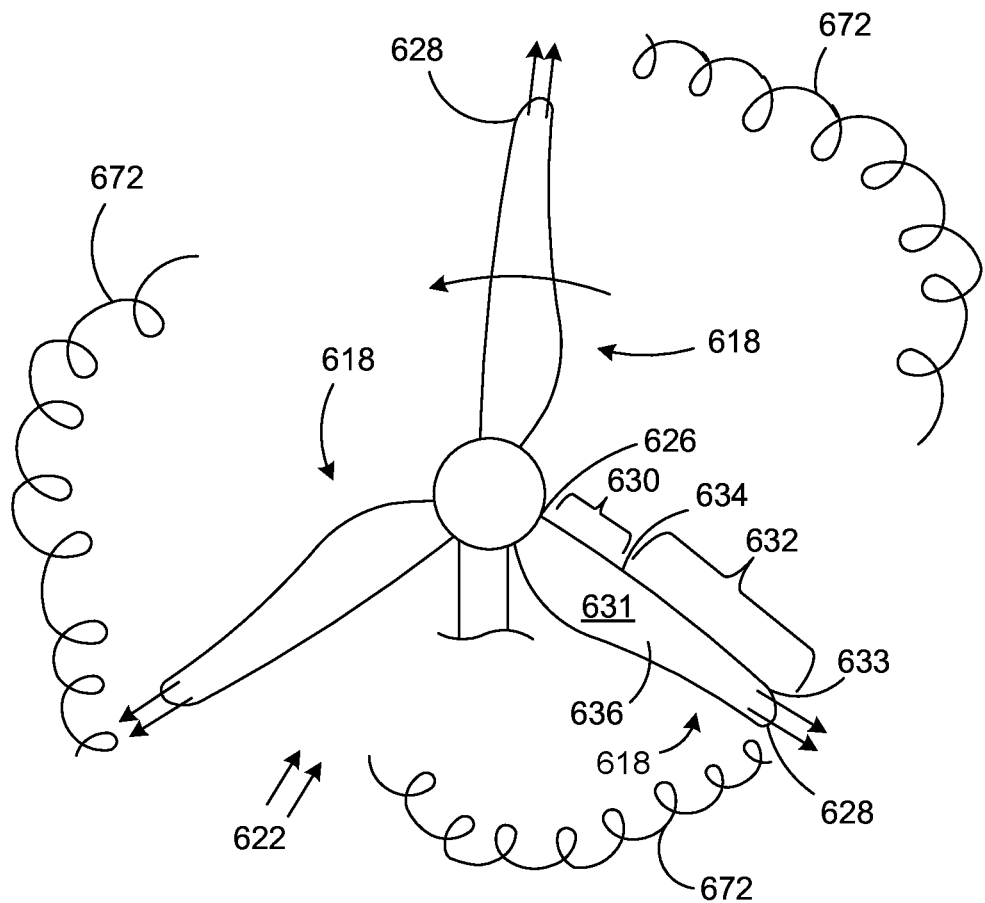
FIG. 16 is a partial front view of another example wind turbine system that includes a co-flow jet.
Figure 17:
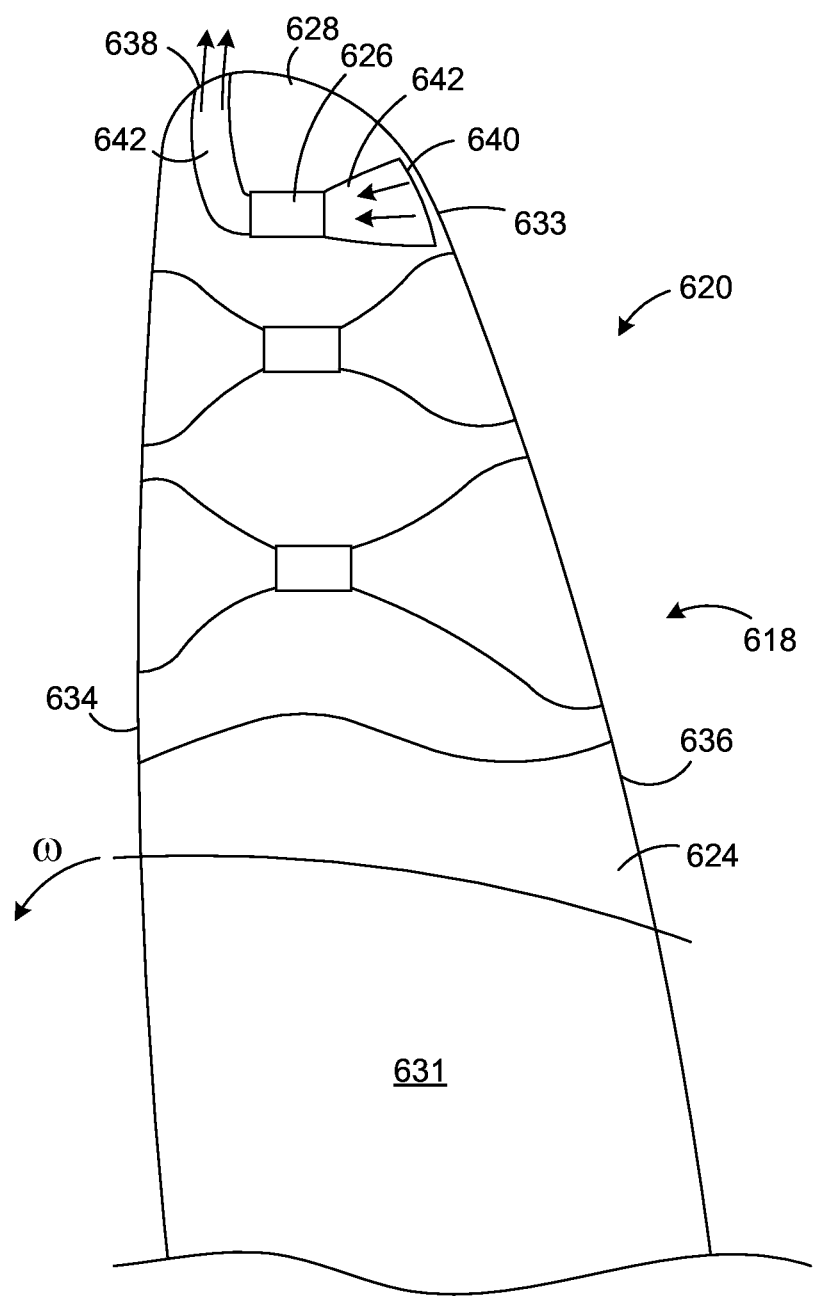
FIG. 17 is a partial sectional view of a blade included in the wind turbine system illustrated in FIG. 16.

FIGS. 16 and 17 illustrate another example wind turbine system that includes blades 618. Each blade 618 includes a co-flow jet. Each blade 618 has a cross-section that defines an airfoil 620 that assists with rotating the blade 618 when wind 622 is directed toward the blade 618 such that energy can be produced by a generator.

In the illustrated embodiment, each blade 618 has a main body 624 and a fluid pressurizer 626. The main body 424 has a root 626, a tip 628, a first portion 630, a second portion 632, a leading edge 634, a trailing edge 636, a front, wind facing surface 631, a rear surface 633, an injection opening 638, a suction opening 640, and a channel 642.

The injection opening 638 is disposed on tip 628, the suction opening 640 is disposed on the rear surface 633 between the leading edge 634 and the trailing edge 436, and the channel 642 extends from the suction opening 640 to the injection opening 638. The injection opening 638 suction opening 640 can be opened and closed such that the blade tip vortex 672 can be interrupted and dissipated during use. This is accomplished by opening the injection opening 638, while the suction opening 640 is opened, such that fluid can be injected into the blade tip vortex 672 radially outward to interrupt and dissipate the blade tip vortex 672. Alternative embodiments, however, can include an injection opening at the blade tip, on a leading edge near a blade tip, on a trailing edge near a blade tip, and/or along a tip chord.

Figure 18:
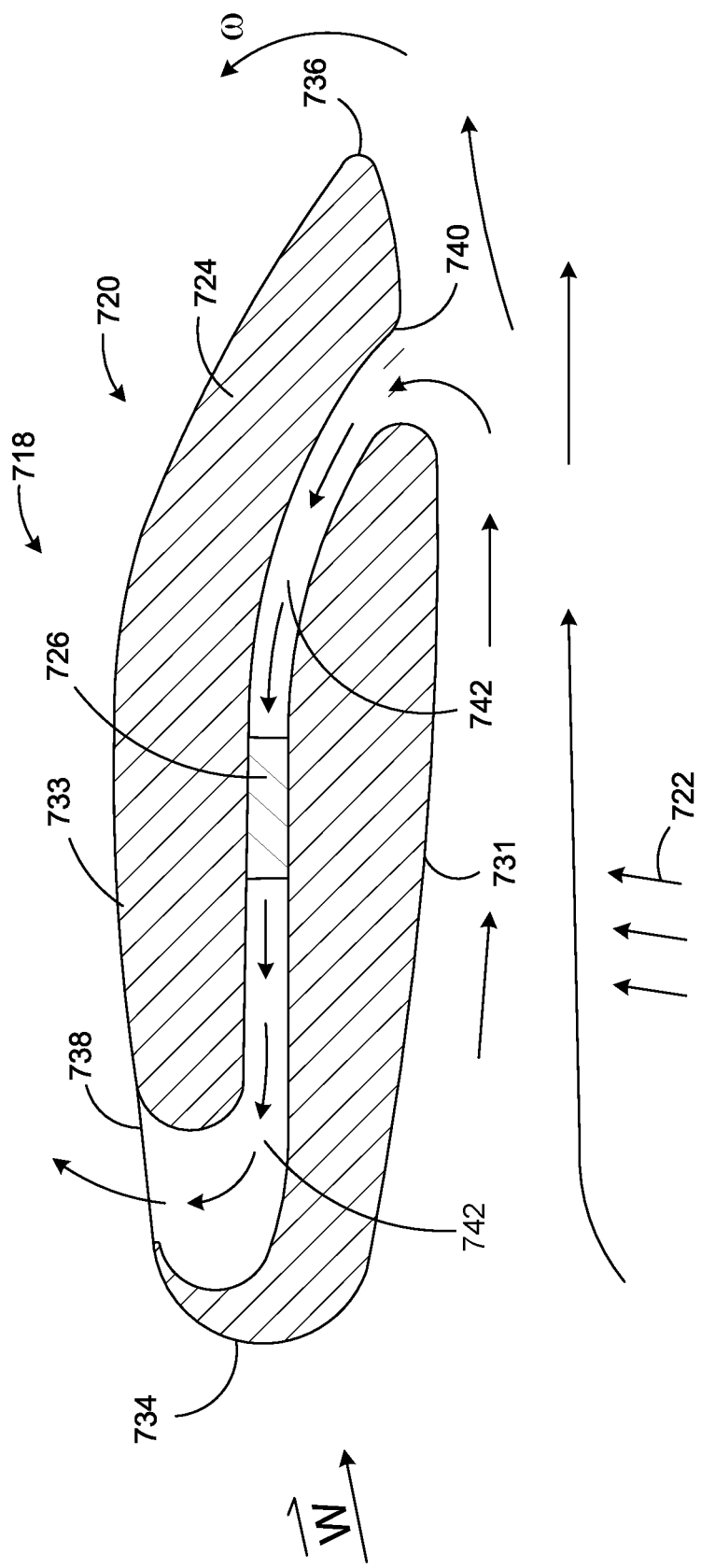
FIG. 18 is a sectional view of another blade that can be included in a wind turbine system.

FIG. 18 illustrates another example blade 718 that includes a co-flow jet and can be included in a wind turbine system. The blade 718 has a cross-section that defines an airfoil 720 that assists with rotating the blade 718 when wind 722 is directed toward the blade 718 such that energy can be produced by a generator.

In the illustrated embodiment, the blade 718 has a main body 724 and a fluid pressurizer 726. The main body 724 has a leading edge 734, a trailing edge 736, a front, wind facing surface 731, a rear surface 733, an injection opening 738, a suction opening 740, and a channel 742.

The injection opening 738 is disposed on the rear surface 733 between the leading edge 734 and the trailing edge 736, the suction opening 740 is disposed on the front, wind facing surface 731 between the leading edge 734 and the trailing edge 736. The channel 742 extends from the suction opening 740 to the injection opening 738. Optionally, this structural arrangement can be used in combination with the structural arrangement (e.g., features) illustrated in FIGS. 16 and 17, or any other features described herein, to accomplish interruption and dissipation of a blade tip vortex.

Figure 19:
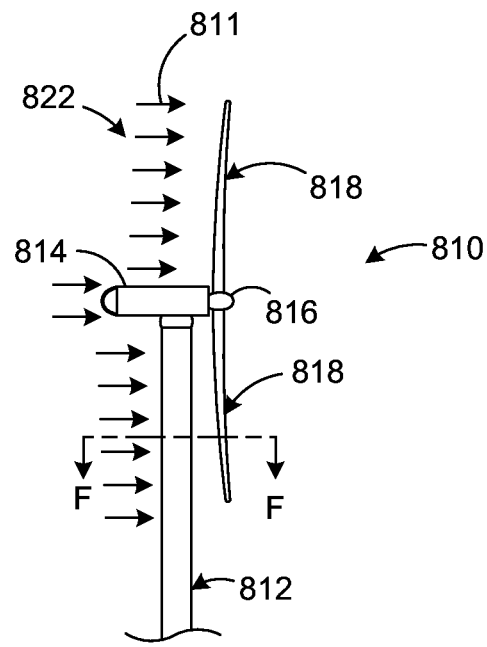
FIG. 19 is a partial side view of another example wind turbine system that includes a co-flow jet.
Figure 20:
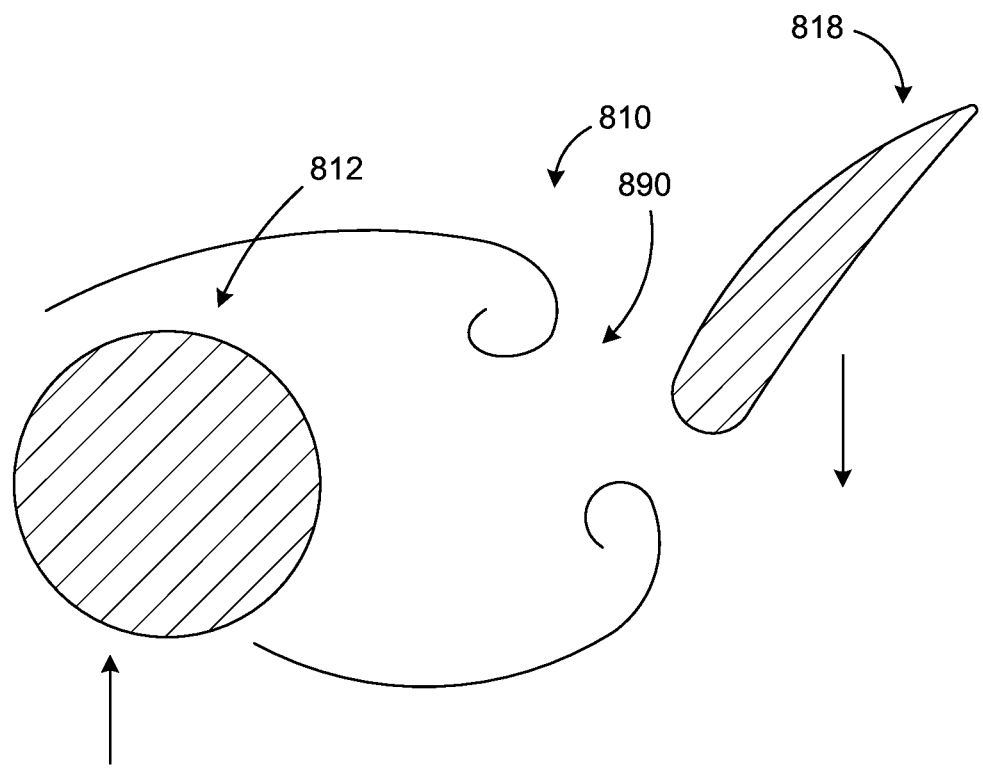
FIG. 20 is a cross-sectional view of the wind turbine system illustrated in FIG. 19 taken along line F-F.

FIGS. 19 and 20 illustrate another example wind turbine system 810 that includes a co-flow jet. The wind turbine system 810 is subjected to a fluid flow field 811. The wind turbine system 810 has a tower 812, a nacelle 814, which may include a conventional gear box and/or generator (e.g., attached to the gear box), a hub 816 attached to the nacelle (e.g., gear box), and a plurality of blades 818. As shown in FIGS. 19 and 20, the wind turbine system 810 is a downwind wind turbine system 810 in which the tower 812 is positioned between the incoming wind 822 and the blades 818. Any of the structural arrangements described herein can be utilized in a downwind wind turbine system 810 to avoid use of angle of attack oscillation when a blade 818 enters a wake 890 created by the tower 812. Use of the structural arrangements described herein increase resistance to dynamic stall with mitigated oscillating load with constant jet strength out of an injection opening. In addition, the jets created can be adjusted to reduce the oscillating load by increasing the jet strength (e.g., increasing pressure through fluid pressurizer) when a blade enters a wake and reducing the jet strength (e.g., decreasing pressure through fluid pressurizer) when the blade leaves a wake.

While the wind turbine blades described herein have been illustrated as being a component of a wind turbine system, a wind turbine blade, such as those described herein, can be provided independent of a wind turbine system. In addition, while the structural arrangements, features, and components described herein have been illustrated as applied to wind turbine blades, the structural arrangements, features, and components described herein can be used in any suitable environment and/or on any suitable structure (e.g., blade), such as water turbines, tidal turbines, pump blades, helicopter blades, aircraft wings, gas turbines, steam turbines, compressors, and/or fans.

Those with ordinary skill in the art will appreciate that various modifications and alternatives for the described and illustrated examples can be developed in light of the overall teachings of the disclosure, and that the various elements and features of one example described and illustrated herein can be combined with various elements and features of another example without departing from the scope of the invention. Accordingly, the particular arrangement of elements disclosed herein have been selected by the inventor simply to describe and illustrate examples of the invention and are not intended to limit the scope of the invention or its protection, which is to be given the full breadth of the appended claims and any and all equivalents thereof.

What is claimed is:

1. A wind turbine system comprising:
a tower, a nacelle attached to the tower, a hub attached to the nacelle, and a blade attached to the hub;
the blade having a main body, the main body having a root, a tip, a first portion, a second portion, a leading edge, a trailing edge, an injection opening, a suction opening, and a channel, the first portion extending from the root toward the tip, the first portion having a first cross-sectional shape and the second portion having a second cross-sectional shape that is different than the first cross-sectional shape, the injection opening disposed on the first portion between the leading edge and the trailing edge, in a cross-section of the first portion the injection opening disposed at an angle relative to a relative velocity of said wind turbine system and a central portion of the main body that is equal to about 90 degrees, the channel extending from the suction opening to the injection opening; and
a fluid pressurizer disposed within the channel.

2. The wind turbine system of claim 1, wherein the blade has a front, wind facing surface and a rear surface; and
wherein the injection opening is disposed on the rear surface.

3. The wind turbine system of claim 1, wherein the blade has a front, wind facing surface and a rear surface; and
wherein the suction opening is disposed on the rear surface.

4. The wind turbine system of claim 1, wherein the first portion has a cylindrical cross-sectional shape.

5. The wind turbine system of claim 1, wherein the second portion has a cross-sectional shape that defines an airfoil.

6. The wind turbine system of claim 1, wherein the blade has a length that extends from the root to the tip; and
wherein the first portion has a length that is equal to about 25% of the length of the blade.

7. The wind turbine system of claim 1, wherein the entire suction opening and the entire channel are disposed on the first portion.

8. The wind turbine system of claim 1, wherein the second portion extends from the tip toward the first portion.

9. The wind turbine system of claim 8, wherein the main body has a second injection opening, a second suction opening, and a second channel; and
wherein the second injection opening, the second suction opening, and the second channel are disposed on the second portion.

10. The wind turbine system of claim 1, wherein the blade has a diameter;
wherein the injection opening has a first width and the suction opening has a second width, the first width being between about 0.1% and about 3% of the diameter of the blade, the second width being between about 0.2% and about 4% of the diameter of the blade.

11. The wind turbine system of claim 1, wherein the blade has a diameter;
wherein the injection opening has a first width and the suction opening has a second width, the first width being between about 1% and about 1.5% of the diameter of the blade, the second width being between about 1.5% and about 3% of the diameter of the blade.

12. The wind turbine system of claim 1, wherein the suction opening is disposed between the injection opening and the trailing edge.

13. A wind turbine system comprising:
a tower, a nacelle attached to the tower, a hub attached to the nacelle, and a blade attached to the hub;
the blade having a main body, the main body having a root, a tip, a front, wind facing surface, a rear surface, a first portion, a second portion, a leading edge, a trailing edge, a plurality of injection openings, a plurality of suction openings, and a plurality of channels, the first portion extending from the root toward the tip, the first portion having a first cylindrical cross-sectional shape and the second portion having a second cross-sectional shape that is different than the first cylindrical cross-sectional shape, each injection opening of the plurality of injection openings disposed on the rear surface between the leading edge and the trailing edge, an injection opening of the plurality of injection openings disposed on the first portion and in a cross-section of the first portion disposed at an angle relative to a relative velocity of said wind turbine system and a central portion of the main body that is equal to about 90 degrees, each suction opening of the plurality of suction openings disposed on the rear surface, each channel of the plurality of channels extending from a suction opening of the plurality of suction openings to an injection opening of the plurality of injection openings; and a plurality of fluid pressurizers, a fluid pressurizer of the plurality of fluid pressurizers disposed within each channel of the plurality of channels.

14. The wind turbine system of claim 13, wherein a first set of injection openings of the plurality of injection openings, a first set of suction openings of the plurality of suction openings, and a first set of channels of the plurality of channels are disposed on the first portion; and wherein a second set of injection openings of the plurality of injection openings, a second set of the suction openings of the plurality of suction openings, and a second set of channels of the plurality of channels are disposed on the second portion.

15. A wind turbine system comprising:

a tower, a nacelle attached to the tower, a hub attached to the nacelle, and a blade attached to the hub;

the blade having a main body and a plurality of fluid pressurizers, the main body having a root, a tip, a front, wind facing surface, a rear surface, a first portion, a second portion, a leading edge, a trailing edge, a plurality of injection openings, a plurality of suction openings, and a plurality of channels, the first portion extending from the root toward the tip, the first portion having a first cylindrical cross-sectional shape and the second portion having a second cross-sectional shape that is different than the first cylindrical cross-sectional shape, each injection opening of the plurality of injection openings disposed on the rear surface between the leading edge and the trailing edge, an entire injection opening of the plurality of injection openings disposed on the first portion and in a cross-section of the first portion disposed at an angle relative to a relative velocity of said wind turbine system and a central portion of the main body that is equal to about 90 degrees, each suction opening of the plurality of suction openings disposed on the rear surface, each channel of the plurality of channels extending from a suction opening of the plurality of suction openings to an injection opening of the plurality of injection openings; and a fluid pressurizer of the plurality of fluid pressurizers disposed within each channel of the plurality of channels.

16. The wind turbine system of claim 1, wherein the entire suction opening is disposed on the first portion.

17. The wind turbine system of claim 1, wherein the entire channel is disposed on the first portion.

18. The wind turbine system of claim 13, wherein an entire suction opening of the plurality of suction openings is disposed on the first portion.

19. The wind turbine system of claim 15, wherein an entire suction opening of the plurality of suction openings is disposed on the first portion.

20. The wind turbine system of claim 1, wherein the suction opening is disposed at an angle relative to a relative velocity of said wind turbine system and the central portion of the main body that is equal to about 45 degrees.

* * * * *